US012739417B2

(12) United States Patent
Yang

(10) Patent No.: US 12,739,417 B2
(45) Date of Patent: Sep. 15, 2026

(54) DEVICE AND METHOD FOR DECODING VIDEO DATA

(71) Applicant: SHARP KABUSHIKI KAISHA, Sakai City (JP)

(72) Inventor: Yu-Chiao Yang, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/815,658

(22) Filed: Aug. 26, 2024

(65) Prior Publication Data

US 2025/0071305 A1 Feb. 27, 2025

Related U.S. Application Data

(60) Provisional application No. 63/534,712, filed on Aug. 25, 2023.

(51) Int. Cl.

*H04N 19/44* (2014.01)
*H04N 19/176* (2014.01)
*H04N 19/186* (2014.01)
*H04N 19/80* (2014.01)

(52) U.S. Cl.

CPC ........... *H04N 19/44* (2014.11); *H04N 19/176* (2014.11); *H04N 19/186* (2014.11); *H04N 19/80* (2014.11)

(58) Field of Classification Search

CPC .. H04N 19/105; H04N 19/117; H04N 19/176; H04N 19/186; H04N 19/44; H04N 19/80
See application file for complete search history.

(56) References Cited

U.S. PATENT DOCUMENTS

| | | | | |
|---|---|---|---|---|
| 2023/0412801 | A1* | 12/2023 | Yang | H04N 19/593 |
| 2024/0357097 | A1* | 10/2024 | Chen | H04N 19/176 |
| 2025/0008108 | A1* | 1/2025 | Li | H04N 19/186 |
| 2025/0016343 | A1* | 1/2025 | Chen | H04N 19/105 |
| 2025/0240437 | A1* | 7/2025 | Heo | H04N 19/159 |

(Continued)

OTHER PUBLICATIONS

Series H: Audiovisual and Multimedia Systems Infrastructure of audiovisual services—Coding of moving video, High efficiency video coding, ITU-T H.265 (Aug. 2021).

(Continued)

*Primary Examiner* — Boubacar Abdou Tchoussou
(74) *Attorney, Agent, or Firm* — ScienBiziP, P.C.

(57) ABSTRACT

A method of decoding video data performed by an electronic device is provided. The method receives the video data and determines a block unit from a current frame included in the video data. The method determines a first chroma prediction block of the block unit based on a luma vector of the block unit, and determines a second chroma prediction block of the block unit using a cross-component filter based on a reconstructed luma block of the block unit. The method determines, from the video data, a weighting index for selecting, from multiple predefined parameters, multiple weighting parameters of the first chroma prediction block and the second chroma prediction block based on the weighting index. The method reconstructs the block unit based on the first chroma prediction block, the second chroma prediction block, and the weighting parameters.

19 Claims, 10 Drawing Sheets

(56) References Cited

U.S. PATENT DOCUMENTS

2025/0247557 A1* 7/2025 Ma ....................... H04N 19/119

OTHER PUBLICATIONS

Series H: Audiovisual and Multimedia Systems Infrastructure of audiovisual services—Coding of moving video, Versatile video coding, ITU-T H.266 (Apr. 2022).

Muhammed Coban et al., "Algorithm description of Enhanced Compression Model 9 (ECM 9)", JVET-AD2025, Joint Video Experts Team (JVET) of ITU-T SG 16 WP 3 and ISO/IEC JTC 1/SC 29, 30th Meeting, Antalya, TR, Apr. 21-28, 2023.

Adrian Browne et al., "Algorithm description for Versatile Video Coding and Test Model 20 (VTM20)", JVET-AD2002-v1, Joint Video Experts Team (JVET) of ITU-T SG 16 WP 3 and ISO/IEC JTC 1/SC 29, 30th Meeting, Antalya, TR, Apr. 21-28, 2023.

* cited by examiner

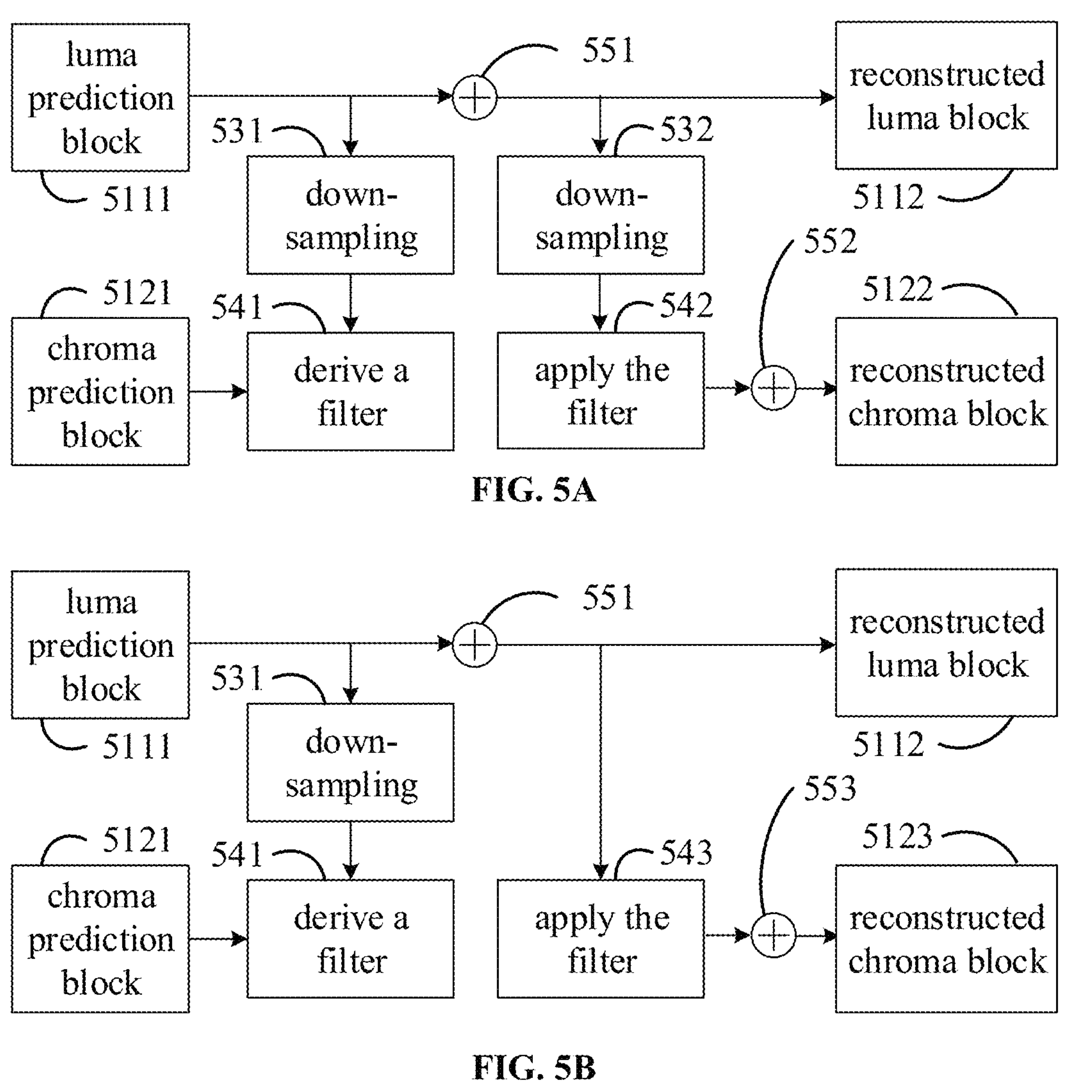
FIG. 5A
FIG. 5B
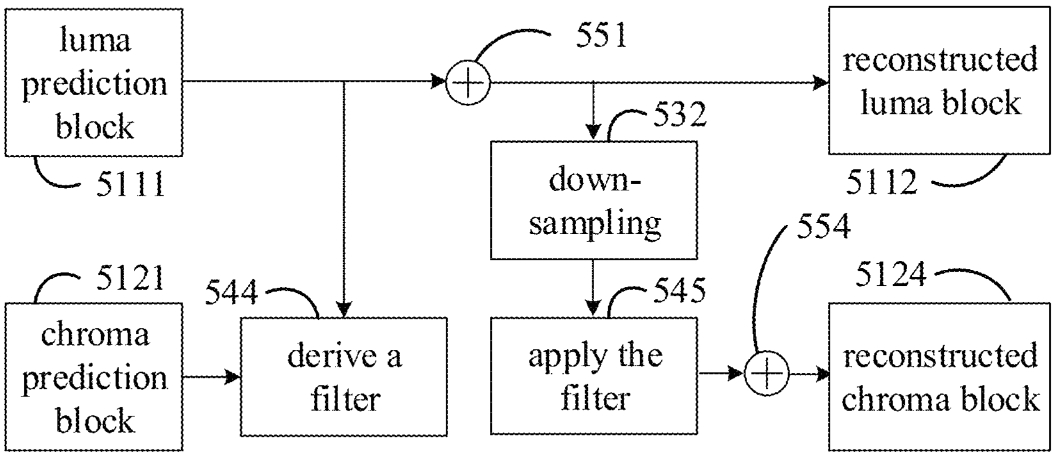
FIG. 5C

DEVICE AND METHOD FOR DECODING VIDEO DATA

CROSS-REFERENCE TO RELATED APPLICATION(S)

The present disclosure claims the benefit of and priority to U.S. Provisional Patent Application Ser. No. 63/534,712, filed on Aug. 25, 2023, entitled "Convolutional Cross-Component Inter Prediction Model with Multi-Downsampling Filters," the content of which is hereby incorporated herein fully by reference in its entirety for all purposes.

FIELD

The present disclosure generally relates to video coding, and more specifically, to techniques for predicting a chroma block unit of a block unit using a weighting combination of multiple prediction blocks determined based on a luma vector and a cross-component filter of the block unit.

BACKGROUND

Cross-component prediction (CCP) mode is a chroma coding tool for video coding, in which, an encoder and/or a decoder may predict a chroma block of a current block based on a luma block of the current block by using a prediction model.

In addition, the encoder and/or the decoder may derive the prediction model of the chroma block based on a luma vector of the luma block generated prior to the reconstruction of the chroma block. A reference block indicated by the luma vector, however, may be far from the current block. Thus, the prediction model of the chroma block derived based on the reference block may be inadequate to predict all of several chroma samples in the chroma block.

Thus, model refinement modes may be required for the encoder and/or the decoder to be able to precisely and efficiently predict and/or reconstruct the chroma block of the block unit.

SUMMARY

The present disclosure is directed to a device and method for predicting a chroma block unit of a block unit using a weighting combination of multiple prediction blocks determined based on a luma vector and a cross-component filter of the block unit.

In a first aspect of the present disclosure, a method of decoding video data and an electronic device for performing the method are provided. The method includes receiving the video data; determining a block unit from a current frame included in the video data; determining a first chroma prediction block of the block unit based on a luma vector of the block unit; determining a second chroma prediction block of the block unit using a cross-component filter based on a reconstructed luma block of the block unit; determining, from the video data, a weighting index for selecting, from a plurality of predefined parameters, multiple weighting parameters of the first chroma prediction block and the second chroma prediction block based on the weighting index; and reconstructing the block unit based on the first chroma prediction block, the second chroma prediction block, and the multiple weighting parameters.

An implementation of the first aspect of the present disclosure further includes weightedly combining the first chroma prediction block and the second chroma prediction block based on the multiple weighting parameters to generate a predicted chroma block, wherein reconstructing the block unit is further based on the predicted chroma block.

An implementation of the first aspect of the present disclosure further includes determining a chroma reconstruction block of a reference block as the first chroma prediction block of the block unit, the reference block indicated by the luma vector of the block unit.

An implementation of the first aspect of the present disclosure further includes determining a luma reconstruction block of the reference block as a luma prediction block of the block unit; and deriving the cross-component filter based on the luma prediction block and the first chroma prediction block of the block unit for determining the second chroma prediction block of the block unit.

In another implementation of the first aspect of the present disclosure, the current frame is an inter-frame, the reference block is included in the current frame, and the luma vector of the block unit is a luma block vector, having a direction from the block unit to the reference block in the current frame.

In another implementation of the first aspect of the present disclosure, the luma block vector is determined based on one of a luma intra block copy (IBC) vector and an intra template matching prediction (IntraTMP) mode.

In another implementation of the first aspect of the present disclosure, the current frame is an inter-frame, the reference block is included in a reference frame, different from the current frame, and the luma vector of the block unit is a luma motion vector, having a direction from a co-located block of the block unit to the reference block in the reference frame.

An implementation of the first aspect of the present disclosure further includes selecting one of multiple inter cross-component prediction (CCP) merge candidates for the block unit; and determining the cross-component filter from the selected one of the multiple inter CCP merge candidates.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

FIGS. 5A-5C are schematic illustrations of the prediction of the chroma block unit using the cross-component filter and at least one down-sampling filter, in accordance with one or more example implementations of this disclosure.

DETAILED DESCRIPTION

Figure 1:
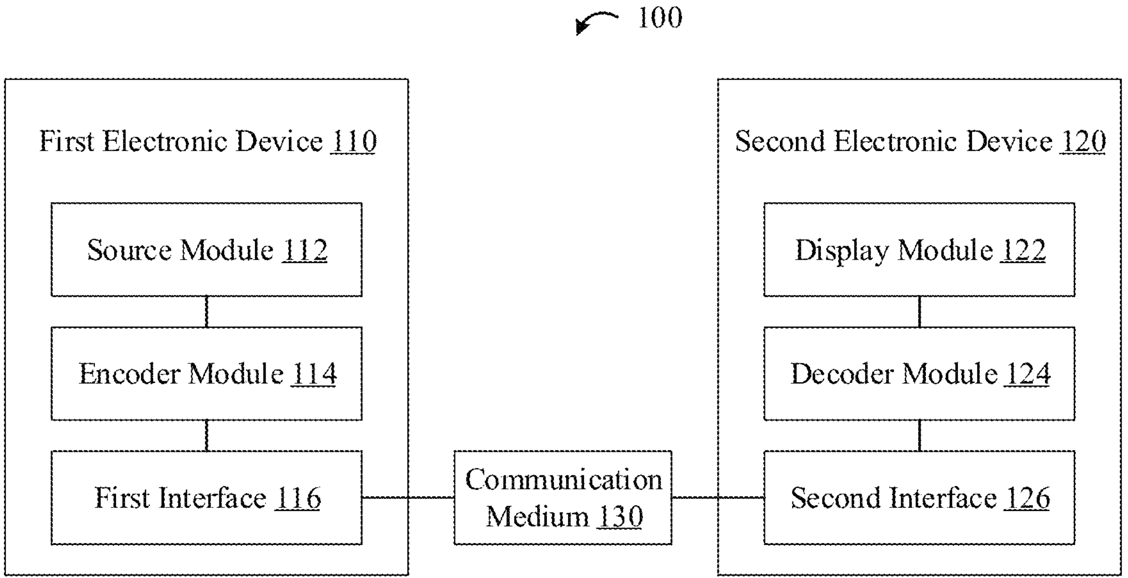
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and case of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function (s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any one of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
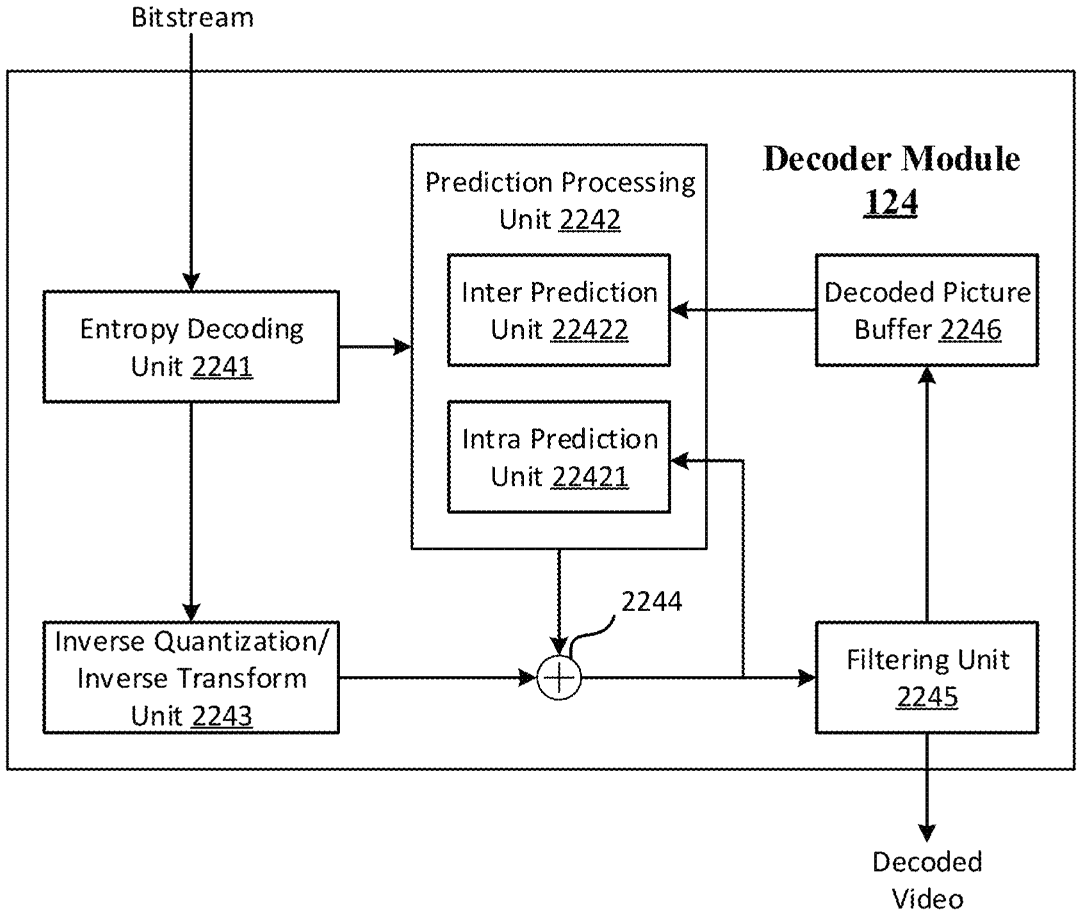
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame, as the current block unit, based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the multiple chroma components is reconstructed by the prediction processing unit 2242.

The intra prediction unit 22421 may reconstruct multiple chroma components of the current block unit based on the multiple luma components of the current block unit when the multiple luma components of the current block unit is reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove the blocking artifacts from the reconstructed block. Additional filters (in loop or post loop) may also be used in addition to the deblocking filter, the SAO filter, the bilateral filter, and the ALF. Such filters (are not explicitly illustrated for brevity of the description) may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any one of a variety of memory devices, such as a dynamic random-access memory (DRAM), including synchronous DRAM (SDRAM), magneto-resistive RAM (MRAM), resistive RAM (RRAM), or other types of memory devices. The decoded picture buffer 2246 may be on-chip along with other components of the decoder module 124 or may be off-chip relative to those components.

Figure 3:
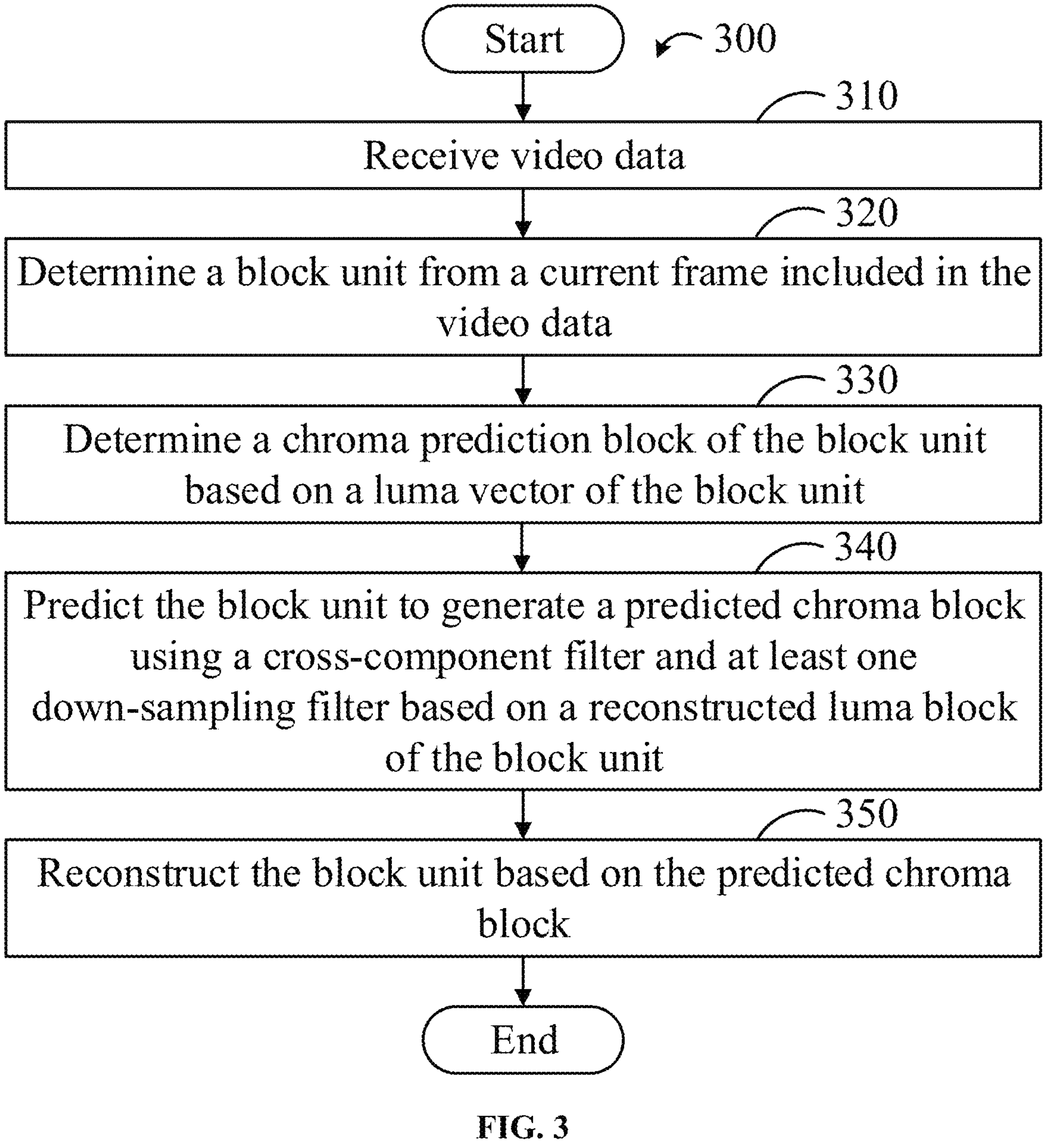
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there may be a variety of mechanisms of decoding the video data.

The method/process 300 may be performed by an electronic device using the configurations illustrated in FIGS. 1 and/or 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus the order may be different from what is illustrated. Additional blocks may be added or fewer blocks may be utilized without departing from the scope of the present disclosure.

At block 310, the method/process 300 may start by receiving (e.g., via the decoder module 124, as shown in FIG. 2) the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126.

At block 320, the decoder module 124 may determine a block unit from a current frame included in the video data.

With reference to FIGS. 1 and 2, the decoder module 124 may determine the image frames included in the bitstream when the video data received by the decoder module 124 includes the bitstream. The current frame may be one of the image frames determined according to the bitstream. The decoder module 124 may further divide the current frame to determine the block unit according to the partition indications in the bitstream. In some implementations, the decoder module 124 may divide the current frame to generate multiple CTUs, and may further divide a current CTU included in the CTUs to generate multiple divided blocks and to determine the block unit from the divided blocks, according to the partition indications (e.g., based on any video coding standard). In some other implementations, the decoder module 124 may divide the current frame to generate multiple slices, and further divide a current slice included in the slices to generate multiple CTUs. In addition, the decoder module 124 may further divide a current CTU included in the CTUs to generate multiple divided blocks and to determine the block unit from the divided blocks, according to the partition indications. The size of the block unit may be Wb×Hb. In some implementations, each of the Wb and Hb may be a positive integer (e.g., 4, 8, etc.) that may be equal to, or different from, each other.

The image frames may include multiple inter-frames and multiple intra-frames. In some implementations, the current frame may be one of the inter-frames in the image frames. In other words, the divided blocks in the current frame may be intra-predicted or inter-predicted for reconstructing the current frame. In addition, the current frame may be different from the intra-frames, since an inter prediction may not be available for the intra-frame. In some implementations, the current slice including the block unit may be an inter-slice included in the slices of the current frame.

At block 330, the decoder module 124 may determine a chroma prediction block of the block unit based on a luma vector of the block unit.

The block unit may include a luma block unit and a chroma block unit. Since the luma block unit may be reconstructed prior to the reconstruction of the chroma block unit, the luma vector may be determined for predicting and reconstructing the luma block unit of the block unit prior to the reconstruction of the chroma block unit. The luma vector may have a direction from a block location of the block unit towards a reference location of a reference block. In other words, the reference block may be indicated by the luma vector of the block unit.

In some implementations, the reference block may be determined from, and included in, the current frame, where the current frame may be one of the inter-frames. In addition, the luma vector of the block unit may be a luma block vector, having a direction from the block unit to the reference block in the current frame. In some other implementations, the reference block may be determined from a reference frame, different from the current frame, and the current frame may be one of the inter-frames. In addition, the luma vector of the block unit may be a luma motion vector, having a direction from a co-located block of the block unit to the reference block. The co-located block in the reference frame may be co-located with the block unit in the current frame. In some implementations, the block unit may be included in the inter-slice of the current frame.

Figure 4A:
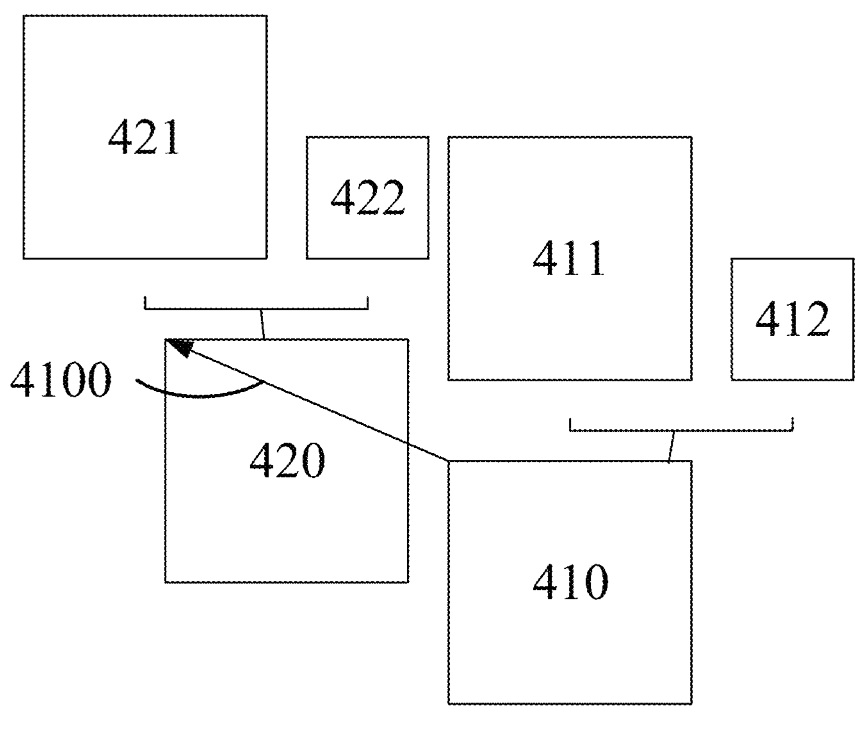
FIGS. 4A and 4B are schematic illustrations of a reference block indicated by a luma vector, in accordance with one or more example implementations of this disclosure.
Figure 4B:
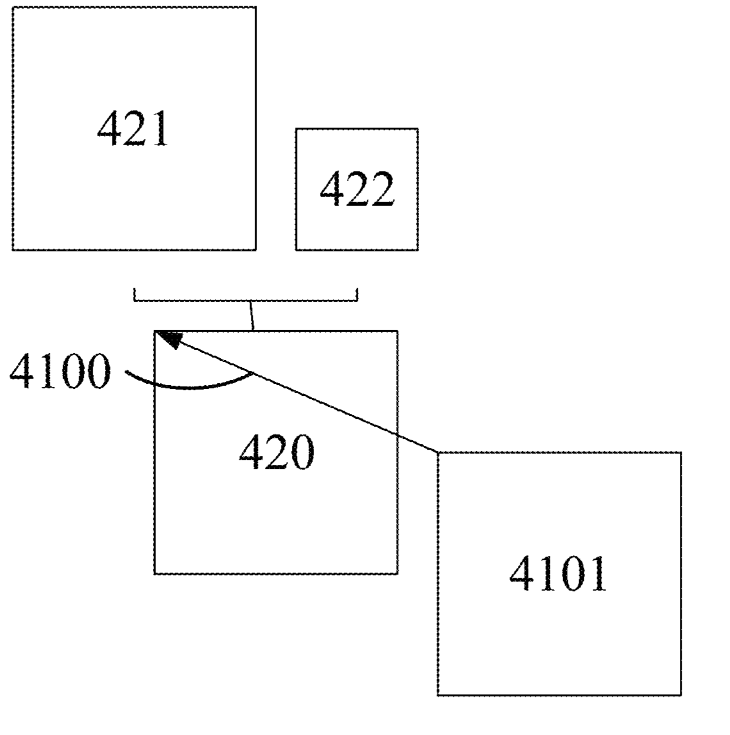

FIGS. 4A and 4B are schematic illustrations of a reference block 420 indicated by a luma vector 4100, in accordance with one or more example implementations of this disclosure. FIG. 4A illustrates the luma vector 4100 having a direction from a block unit 410 towards the reference block 420. In some implementations, the block unit 410 and the reference block 420 may be both included in the current frame when the luma vector 4100 of the block unit 410 is the luma block vector, having a direction from the block unit 410 to the reference block 420 in the current frame. The block unit 410 may further include a luma block unit 411 and a chroma block unit 412 in the current frame and the reference block 420 may also include a luma reference unit 421 and a chroma reference unit 422 in the current frame, when the luma vector is the luma block vector. In some implementations, the luma block vector having a direction from the block location of the block unit 410 towards the reference location of the reference block 420 may be determined based on one of a luma intra block copy (IBC) vector and an intra template matching prediction (IntraTMP) mode. It should be noted that a determination scheme of the luma block vector 4100 may be changed without departing from the scope of the present disclosure.

FIG. 4B illustrates the luma vector 4100 having a direction from a co-located block 4101 towards the reference block 420. In some implementations, the co-located block 4101 and the reference block 420 may be both included in the reference frame when the luma vector 4100 of the block unit 410 is the luma motion vector, having a direction from the co-located block 4101 of the block unit 410 to the reference block 420 in the reference frame. The co-located block 4101 of the block unit 410 may be selected from the reference frame based on the block location of the block unit 410. For example, coordinates of the co-located block 4101 in the reference frame may be identical to coordinates of the block unit 410 in the current frame, such that a block location of the co-located block 4101 may be the same as the block location of the block unit 410. With reference to FIGS. 4A and 4B, the block unit 410 may further include the luma block unit 411 and the chroma block unit 412 in the current frame and the reference block 420 may further include the luma reference unit 421 and the chroma reference unit 422 in the reference frame when the luma vector is the luma motion vector. In some implementations, the luma motion vector may be searched from a motion search range by the encoder module 114 and provided from the encoder module 114 to the decoder module 124 though the bitstream when the luma block unit 411 is reconstructed in a luma inter mode. In some other implementations, the luma motion vector may be inherited from a luma neighboring vector of other reconstructed block when the luma block unit 411 is reconstructed in a luma inter merge mode. It should be noted that a determination scheme of the luma motion vector having a direction from the block location of the co-located block 4101 towards the reference location of the reference block 420 may be changed without departing from the scope of the present disclosure.

The size of the luma block unit 411 may be identical to the size of the block unit 410. In addition, the size of the chroma block unit 412 may be identical to, or different from, the size of the block unit 410. The size of the chroma block unit 412 may be determined based on a scaling factor. In some implementations, the scaling factor may be determined based on a video format. For example, if the video format is YUV422, the scaling factor may further include a width scaling factor equal to 2 and a height scaling factor equal to 1. Thus, the width of the luma block unit 411 may be double the width of the chroma block unit 412, and the height of the luma block unit 411 may be equal to the height of the chroma block unit 412. Furthermore, the size of the luma reference unit 412 may be identical to the size of the reference block 420, and the size of the chroma reference unit 422 determined based on the scaling factor may be identical to, or different from, the size of the reference block 420.

Since the reference block 420 may be reconstructed prior to the reconstruction of the block unit 410, the luma reference unit 421 and the chroma reference unit 422 may be reconstructed prior to the reconstruction of the block unit 410. Thus, a luma reconstruction block of the luma reference unit 421 and a chroma reconstruction block of the chroma reference unit 422 in the reference block 420 may be determined for predicting and/or reconstructing the block unit 410. For example, the luma reconstruction block of the luma reference unit 421 in the reference block 420 may be determined as a luma prediction block of the block unit 410 for predicting and/or reconstructing the chroma block unit 412 of the block unit 410. In addition, the chroma reconstruction block of the chroma reference unit 422 in the reference block 420 may be determined as a chroma prediction block of the block unit 410 for predicting and/or reconstructing the chroma block unit 412 of the block unit 410. Since the reference block 420 may be determined based on the luma vector 4100 of the block unit 410, the luma prediction block and the chroma prediction block of the block unit 410 generated by the luma reconstruction block of the luma reference unit 421 and the chroma reconstruction block of the chroma reference unit 422 may be determined based on the luma vector 4100 of the block unit 410.

Furthermore, the chroma block unit 412 may further include a Cr block unit and a Cb block unit, and the chroma reference unit 422 may further include a Cr reference unit and a Cb reference unit. In some implementations, when the Cr block unit is predicted and/or reconstructed, the chroma prediction block of the block unit 410, generated from the chroma reconstruction block of the chroma reference unit 422, may be a Cr reconstruction block of the chroma reference unit 422 determined based on the luma vector 4100 of the block unit 410. In some other implementations, when the Cb block unit is predicted and/or reconstructed, the chroma prediction block of the block unit 410, generated from the chroma reconstruction block of the chroma reference unit 422, may be a Cb reconstruction block of the chroma reference unit 422 determined based on the luma vector 4100 of the block unit 410.

Referring back to FIG. 3, at block 340, the decoder module 124 may predict the block unit 410 to generate a predicted chroma block using a cross-component filter and at least one down-sampling filter based on a reconstructed luma block of the block unit 410.

With reference to FIGS. 1 and 2, in some implementations, the decoder module 124 may derive the cross-component filter based on the luma prediction block and the chroma prediction block of the block unit 410 using the at least one down-sampling filter. In addition, the luma prediction block of the block unit 410 may be added to a luma residual block of the block unit 410 to generate the reconstructed luma block of the block unit 410. In some implementations, the decoder module 124 may then predict the block unit 410 using the derived cross-component filter and the at least one down-sampling filter based on the reconstructed luma block of the block unit 410. In some other implementations, the decoder module 124 may predict the block unit 410 only using the derived cross-component filter based on the reconstructed luma block of the block unit 410. In other words, the predicted chroma block may be generated without using the at least one down-sampling filter.

In yet some other implementations, the decoder module 124 may derive the cross-component filter based on the luma prediction block and the chroma prediction block of the block unit 410 without using the at least one down-sampling filter. In other words, the derivation of the cross-component filter may be unrelated to the at least one down-sampling filter. In addition, the luma prediction block of the block unit 410 may also be added to the luma residual block of the block unit 410 to generate the reconstructed luma block of the block unit 410. The decoder module 124 may then predict the block unit 410 to generate the predicted chroma block using the derived cross-component filter and the at least one down-sampling filter based on the reconstructed luma block of the block unit 410.

When the luma block unit 411 is reconstructed, the luma prediction block of the block unit 410 may be added to the luma residual block of the block unit 410 to generate the reconstructed luma block of the block unit 410. Since the luma block unit 411 may be reconstructed prior to the reconstruction of the chroma block unit 412, the reconstructed luma block of the luma block unit 411 may be used to predict and/or reconstruct the chroma block unit 412.

In some implementations, the decoder module 124 may select one of multiple cross-component candidates for deriving the cross-component filter. The cross-component candidates may be stored in the encoder module 114 and the decoder module 124. Thus, the encoder module 114 may add a cross-component index to the bitstream for indicating the selected cross-component candidate when a block-level mode enable flag indicates that the cross-component index is included in the bitstream. In addition, the decoder module 124 may extract the cross-component index from the bitstream by parsing the bitstream for determining the selected cross-component candidate. The number of cross-component candidates may be a positive integer greater than one. The cross-component index may be one of multiple block level indices, included in the bitstream, for indicating the selected cross-component candidate of the block unit 410. The decoder 124 may then derive multiple filter coefficients of the selected cross-component candidate based on the luma prediction block and the chroma prediction block of the block unit 410 to determine the cross-component filter. In some implementations, the filter coefficients may be derived based on the luma prediction block and the chroma prediction block of the block unit 410 using LDL-decomposition-based MSE minimization method.

In some other implementations, the encoder module 114 and the decoder module 124 may store only one cross-component candidate. Thus, the encoder module 114 may directly use the cross-component candidate to derive the cross-component filter without adding the cross-component index to the bitstream. In addition, the decoder module 124 may also directly use the cross-component candidate to derive the cross-component filter without extracting the cross-component index from the bitstream.

The Cr block unit and the Cb block unit of the chroma block unit 412 may be respectively predicted and reconstructed. Thus, in some implementations, the bitstream may include two cross-component indices, each for one of the Cr block unit and the Cb block unit when the number of cross-component candidates is greater than one. In some other implementations, the bitstream may include only one cross-component index for both the Cr block unit and the Cb block unit when the number of cross-component candidates is greater than one. In yet some other implementations, the bitstream may include no cross-component index for the Cr block unit and the Cb block unit when the encoder module 114 and the decoder module 124 store only one cross-component candidate. Since the Cr block unit used to derive a Cr cross-component filter is different from the Cb block unit used to derive a Cb cross-component filter, the filter coefficients of the Cr cross-component filter may be different from those of the Cb cross-component filter. Thus, even if the selected cross-component candidate of the Cr block unit is identical to that of the Cb block unit, the Cr block unit and the Cb block unit may have different cross-component filters.

In some implementations, a filter type of one of the cross-component candidates may be a quadratic equation. The quadratic equation may include Ns luma spatial sample terms, a non-linear term P and one bias term B. The number Ns may be a positive integer, such as 3, 4, 5, 6, 7, 8, or 9. In some implementations, the quadratic equation including five luma spatial sample terms, a non-linear term P and one bias term B may be in a cross-component residual model (CCRM). The five luma spatial sample terms may include the center sample C, the north sample N, the south sample S, the west sample W, and the cast sample E. Thus, two of the cross-component candidates may be shown in the following functions:

$$predChromaVal = c_0 \times C + c_1 \times N + c_2 \times S + c_3 \times E + c_4 \times W + c_5 \times P + c_6 \times B$$

$$predChromaVal = c_0 \times C + c_1 \times N + c_2 \times S + c_3 \times E + c_4 \times W + c_5 \times P(C) + c_6 \times P(N) + c_7 \times P(S) + c_8 \times P(E) + c_9 \times P(W) + c_{10} \times B$$

where the coefficients $c_0$-$c_{10}$ are ten filter coefficients for the luma spatial sample terms C, N, S, W, and E, the non-linear term P, and the bias term B, and predChromaVal may be a predicted chroma sample located at a sample position (x, y) relative to a top-left chroma sample of the block unit 410. In addition, P may be the non-linear term P(Q) equal to (Q×Q+midVal)>>bitDepth, and B may be the bias term equal to $2^{bitDepth-1}$. The parameter midVal and the bias term B may be set as to a middle luma value, the parameter bitDepth may be a bit depth of the samples in the bitstream. For example, the bias term B may be set as 512 for 10 bits content. In some implementations, the parameter Q in the first one of the two cross-component candidates may be (W+E+N+S+1)>>2. In some other implementations, the parameter Q in the first one of the two cross-component candidates may be (W+E+1)>>1. In yet some other implementations, the parameter Q in the first one of the two cross-component candidates may be (N+S+1)>>1.

In some other implementations, the quadratic equation may include three luma spatial sample terms, a non-linear term P and one bias term B. The three luma spatial sample terms may be selected from the center sample C, the north sample N, the south sample S, the west sample W, and the east sample E. Thus, two of the cross-component candidates may be shown in the following functions:

$$predChromaVal = c_0 \times C + c_1 \times N + c_2 \times S + c_3 \times P + c_4 \times B$$

$$predChromaVal = c_0 \times C + c_1 \times E + c_2 \times W + c_3 \times P + c_4 \times B$$

where the coefficients $c_0c_4$ are five filter coefficients for the luma spatial sample terms, the non-linear term P, and the bias term B, and predChromaVal may be a predicted chroma sample located at a sample position (x, y) relative to a top-left chroma sample of the block unit 410. In addition, P may be the non-linear term P(Q) equal to (Q×Q+midVal) >>bitDepth, and B may be the bias term equal to $2^{bitDepth-1}$. The parameter midVal and the bias term B of the cross-component candidate having three luma spatial sample terms may be identical to those of the cross-component candidate having five luma spatial sample terms. In some implementations, the parameter Q in the non-linear term P of a cross-component candidate may be (W+E+1)>>1 when the three luma spatial sample terms include the west sample W and the east sample E. In some other implementations, the parameter Q in the non-linear term P of another cross-component candidate may be (N+S+1)>>1 when the three luma spatial sample terms include the north sample N and the south sample S.

In some other implementations, the quadratic equation may include six luma spatial sample terms, a non-linear term P and one bias term B. The six luma spatial sample terms may include six location samples having an above sample L0, an above-left sample L1, an above-right sample L2, a bottom sample, a bottom-left sample L4, and a bottom-right sample L5. Thus, a cross-component candidate may be shown in the following function:

$$predChromaVal = c_0 \times L0 + c_1 \times L1 + c_2 \times L2 + c_3 \times L3 + c_4 \times L4 + c_5 \times L5 + c_6 \times P + c_7 \times B$$

where the coefficients $c_0$-$c_7$ are seven filter coefficients for the luma spatial sample terms, the non-linear term P, and the bias term B, and predChromaVal may be a predicted chroma sample located at a sample position (x, y) relative to the top-left chroma sample of the block unit 410. In addition, P may be the non-linear term P(Q) equal to (Q×Q+midVal) >>bitDepth, and B may be the bias term equal to $2^{bitDepth-1}$. The parameter midVal and the bias term B of the cross-component candidate having three luma spatial sample terms may be identical to those of the cross-component candidate having five luma spatial sample terms. In some implementations, the parameter Q in the non-linear term P may be (L0+L3+1)>>1. It should be noted that the cross-component candidates may be changed without departing from the scope of the present disclosure.

In some implementations, each of the center sample C, the north sample N, the south sample S, the west sample W, the cast sample E, and the location samples may be subtracted by a luma offset value to generate a center value C', a north value N', a south value S', a west value W', an cast value E', and location values L0'-L5' multiple. When the center sample C, the north sample N, the south sample S, the west sample W, and the cast sample E in the cross-component candidate is replaced by the center value C', the north value N', the south value S', the west value W', and the cast value E', the calculation result of the cross-component candidate may need to add to a chroma offset value to generate the predicted chroma sample. In addition, the location samples L0-L5 in the cross-component candidate is replaced by the location value L0'-L5', the calculation result of the cross-component candidate may need to add to the offset value to generate the predicted chroma sample. In some implementations, the luma offset value may be calculated based on four corner samples of the luma block unit 411. In some implementations, the chroma offset value may be calculated based on multiple chroma reference samples neighboring the top-left chroma sample of the block unit 410.

In some implementations, the decoder module 124 may select a down-sampling filter from multiple down-sampling candidates. The down-sampling candidates may be stored in the encoder module 114 and the decoder module 124. Thus, the encoder module 114 may add a down-sampling index to the bitstream for indicating the selected down-sampling filter. In addition, the decoder module 124 may extract the down-sampling index from the bitstream by parsing the bitstream for determining the selected down-sampling filter. The number of down-sampling candidates may be a positive integer greater than one. The down-sampling index may be a block level index included in the bitstream.

In some other implementations, the encoder module 114 and the decoder module 124 may store only one down-sampling candidate. Thus, the encoder module 114 may directly use the down-sampling candidate, as the down-sampling filter, without adding the down-sampling index to the bitstream. In addition, the decoder module 124 may also directly use the down-sampling candidate, as the down-sampling filter, without extracting the down-sampling index from the bitstream.

The Cr block unit and the Cb block unit of the chroma block unit 412 may be respectively predicted and reconstructed. Thus, in some implementations, the bitstream may include only one down-sampling index for both the Cr block unit and the Cb block unit or two down-sampling indices each for one of the Cr block unit and the Cb block unit when the number of down-sampling candidates is greater than one. In some other implementations, the bitstream may include only one down-sampling index for both the Cr block unit and the Cb block unit when the number of down-sampling candidates is greater than one. In yet some other implementations, the bitstream may include no down-sampling index for the Cr block unit and the Cb block unit when the encoder module 114 and the decoder module 124 store only one down-sampling candidate.

In some implementations, some down-sampling candidates for the video format YUV420 may be shown in the following functions:

$$s(x, y) = (L(2x-1, 2y) + 2*L(2x, 2y) + L(2x+1, 2y) + L(2x-1, 2y+1) + 2*L(2x, 2y+1) + L(2x+1, 2y+1)) \gg 3$$

$$s(x, y) = (L(2x, 2y-1) + L(2x-1, 2y) + 4*L(2x, 2y) + L(2x+1, 2y) + L(2x, 2y+1)) \gg 3$$

$$s(x, y) = (L(2x-1, 2y-1) + 2*L(2x, 2y-1) + L(2x+1, 2y-1) + L(2x-1, 2y) + 2*L(2x, 2u) + L(2x+1, 2y) + 4) \gg 3$$

where s(x,y) may be a luma down-sampled sample located at a sample position (x,y) relative to a top-left chroma sample of the block unit 410 and L(u,v) may be a luma value located at a sample position (u,v) relative to a top-left luma sample of the block unit 410 and corresponding to the sample position (x,y). The coordinates (u,v) may be determined based on the video format. For example, when the video format YUV420, the width scaling factor and the height scaling factor may be both equal to 2. Thus, the coordinates (u,v) may be associated with a scaled position (2x,2y). It should be noted that the down-sampling candidates may be changed without departing from the scope of the present disclosure.

FIGS. 5A-5C are schematic illustrations of the prediction of the chroma block unit using the cross-component filter and at least one down-sampling filter, in accordance with one or more example implementations of this disclosure. FIG. 5A illustrates a prediction of the chroma block unit using two down-sampling filters. In some implementations, the two down-sampling filters at block 531 and block 532 may be identical. With reference to FIGS. 4A and 4B, at block 531, the luma prediction block 5111 of the luma block unit 411 may be down-sampled by the down-sampling filter to generate a down-sampled prediction block of the luma block unit 411. At block 541, the down-sampled prediction block of the luma block unit 411 and the chroma prediction block 5121 of the chroma block unit 412 may be used to derive multiple filter coefficients of the selected cross-component candidate to generate the cross-component filter. Since the size of the down-sampled prediction block is identical to the size of the chroma block unit 412, the down-sampled prediction block of the luma block unit 411 and the chroma prediction block 5121 of the chroma block unit 412 may be allowed to derive the generated cross-component filter.

At block 551, the luma prediction block 5111 of the luma block unit 411 may be added to the luma residual block of the luma block unit 411 to generate the reconstructed luma block 5112 of the luma block unit 411. At block 532, the reconstructed luma block 5112 of the luma block unit 411 may be further down-sampled by the down-sampling filter to generate a down-sampled reconstruction block of the luma block unit 411. At block 542, the down-sampled reconstruction block of the luma block unit 411 may be applied to the generated cross-component filter to generate the predicted chroma block of the chroma block unit 412. Since the size of the down-sampled reconstruction block is identical to the size of the chroma block unit 412, the down-sampled reconstruction block of the luma block unit 411 may be allowed to generate the predicted chroma block of the chroma block unit 412 using the generated cross-component filter.

FIG. 5B illustrates a prediction of the chroma block unit 412 using one down-sampling filter. The derivation of the cross-component filter in FIG. 5B may be identical to that of shown in FIG. 5A. In addition, the generation of the reconstructed chroma block 5112 of the luma block unit 411 in FIG. 5B may also be identical to that of shown in FIG. 5A. However, comparing the generation of the predicted chroma block of the chroma block unit 412 in FIG. 5B with that of shown in FIG. 5A, samples in the reconstructed luma block 5112 of the luma block unit 411 may be directly applied to the generated cross-component filter to generate the predicted chroma block of the chroma block unit 412. In other words, the predicted chroma block of the chroma block unit 412 may be generated from the reconstructed chroma block 5112 of the luma block unit 411 without using the down-sampling filter.

However, the size of the reconstructed luma block 5112 of the luma block unit 411 may be different from the size of the chroma block unit 412. Thus, the reconstructed luma block 5112 of the luma block unit 411 may be subsampled for applying to the generated cross-component filter. For example, when the video format is YUV420 and the location samples L0-L5 are included in the generated cross-component filter, the location samples L0-L5, subsampled from the reconstructed chroma block 5112 of the luma block unit 411, may be located, respectively, at six luma locations (2x, 2y), (2x−1, 2y), (2x+1, 2y), (2x, 2y+1), (2x−1, 2y+1), (2x+1, 2y+1) corresponding to the chroma sample location (x,y). The luma location (u,v) may be determined based on the video format. For example, when the video format YUV420, the luma location (u,v) may be associated with the scaled position (2x,2y). Thus, at block 543, the subsampled luma reconstruction block of the luma block unit 411 may be applied to the generated cross-component filter to generate the predicted chroma block of the chroma block unit 412. In some implementations, the luma locations (u,v) of the center sample C, the north sample N, the south sample S, the west sample W, and the cast sample E may be subsampled from the reconstructed chroma block 5112 of the luma block unit 411 and corresponding to the chroma sample location (x,y) based on the video format.

FIG. 5C illustrates another prediction of the chroma block unit 412 using one down-sampling filter. At block 544, the luma prediction block 5111 of the luma block unit 411 and the chroma prediction block 5121 of the chroma block unit 412 may be used to derive the cross-component filter. The derivation of the cross-component filter in FIG. 5C may be different from that of shown in FIG. 5A. Comparing the derivation of the cross-component filter in FIG. 5C with that of shown in FIG. 5A, samples in the luma prediction block 5111 of the luma block unit 411 may be directly used to derive the cross-component filter. In other words, the derived cross-component filter may be generated directly based on the luma prediction block 5111 of the luma block unit 411 without using the down-sampling filter.

However, the size of the luma prediction block 5111 of the luma block unit 411 may be different from the size of the chroma block unit 412. Thus, the luma prediction block 5111 of the luma block unit 411 may be subsampled for deriving the cross-component filter. For example, when the video format is YUV420 and the location samples L0-L5 are used for deriving the cross-component filter, the location samples L0-L5, subsampled from the luma prediction block 5111 of the luma block unit 411, may be located, respectively, at the six luma locations (2x, 2y), (2x−1, 2y), (2x+1, 2y), (2x, 2y+1), (2x−1, 2y+1), (2x+1, 2y+1) corresponding to the chroma sample location (x, y). The luma locations (u, v) may be determined based on the video format. For example, when the video format YUV420, the luma location (u,v) may be associated with the scaled position (2x,2y). In some implementations, the luma locations (u,v) of the center sample C, the north sample N, the south sample S, the west sample W, and the cast sample E may correspond to the chroma sample location (x, y) based on the video format.

The generation of the reconstructed chroma block 5112 of the luma block unit 411 in FIG. 5C may then be identical to that of shown in FIG. 5A. In addition, the generation of the predicted chroma block of the chroma block unit 412 in FIG. 5C may be identical to that of shown in FIG. 5A. In other words, at block 532, the reconstructed luma block 5112 of the luma block unit 411 may be further down-sampled by the down-sampling filter to generate a down-sampled reconstruction block of the luma block unit 411. At block 545, the down-sampled reconstruction block of the luma block unit 411 may be applied to the generated cross-component filter to generate the predicted chroma block of the chroma block unit 412.

With reference to FIGS. 5A-5C, the down-sampling filter may be used prior to the derivation of the cross-component filter. In addition, the down-sampling filter may be used prior to the usage of the cross-component filter. Thus, in some implementations, the down-sampling filter may be merged into the cross-component filter. In other words, the down-sampling filter and the cross-component filter may be calculated at the same times.

In some other implementations, more than one down-sampling filter may be merged into a cross-component filter when the cross-component filter is derived by the down-sampling of the luma prediction block 5111. In addition, the more than one down-sampling filter may be merged into the cross-component filter when the cross-component filter is applied by the down-sampling of the reconstructed luma block 5112. The down-sampling filters of the Ns luma spatial sample terms and the non-linear term P in the cross-component filter may be different from each other. In some implementations, the down-sampling filter of the above sample L0 may be different from the down-sampling filters of the other location samples L1-L5. In some other implementations, the down-sampling filter of the above sample L0 may be identical to a portion of the down-sampling filters of the other location samples L1-L5 and different from the other down-sampling filters of the other location samples L1-L5.

For example, when the video format is YUV420, one of the cross-component filters may include multiple luma spatial sample terms, the non-linear term P, the bias term B, coordinate terms X and Y, and a chroma offset value, as shown in the following functions:

$$predChromaVal = c_0 \times H(C') + c_1 \times G1(C') + c_2 \times G2(C') + c_3 \times G3(C') + c_4 \times P(H(C')) + c_5 \times X + c_6 \times y + c_7 \times B + offsetChroma$$

$$H(T'(x, y)) = [L(2x-1, 2y-1) + 2 \times L(2x, 2y-1) + L(2x+1, 2y-1) + L(2x-1, 2y) + 2 \times L(2x, 2y) + L(2x+1, 2y) + 4)] \gg 3$$

$$G_1(T'(x, y)) = [L(2x-1, 2y-1) - L(2x+1, 2y-1) + L(2x-1, 2y) - L(2x+1, 2y) + 4]$$

$$G_2(T'(x, y)) = [L(2x-1, 2y-1) + 2 \times L(2x, 2y-1) + L(2x+1, 2y-1) - L(2x-1, 2y) - 2 \times L(2x, 2y) - L(2x+1, 2y) + 4]$$

$$G_3(T'(x, y)) = [-L(2x-1, 2y-1) + L(2x, 2y-1) + 2 \times L(2y+1, 2y-1) - 2 \times L(2x-1, 2y) - L(2x, 2y) + L(2x+1, 2y) + 4]$$

where the coefficients $c_0$-$c_7$ are seven filter coefficients for the luma spatial sample terms, the non-linear term P, the bias term B, and the coordinate terms X and Y, and predChromaVal may be a predicted chroma sample located at a sample position (x, y) relative to the top-left chroma sample of the block unit 410. In addition, P may be the non-linear term P(Q) equal to (Q×Q+midVal)>>bitDepth, and B may be the bias term equal to $2^{bitDepth-1}$. The parameter midVal and the bias term B of the cross-component candidate having the down-sampling filters may be identical to those of the above cross-component candidate having five luma spatial sample terms.

In yet some other implementations, one or more down-sampling filters and one or more value filters may be merged into a cross-component filter. Each of the one or more down-sampling filters may be different from, or equal to, each other. In addition, each of the one or more value filters may be different from, or equal to, each other. In some implementations, each of the one or more value filters may be selected from multiple low-pass filters, such as multiple gradient filters, or a smoothing filter.

For example, one of the cross-component filters may include one down-sampling filter DL(m,n), and four value filters H, G1, G2, and G3. In addition, this cross-component filter may further include multiple luma spatial sample terms, the non-linear term P, the bias term B, coordinate terms X and Y, and a chroma offset value, as shown in the following functions:

$$predChromaVal = c_0 \times H(C') + c_1 \times G1(C') + c_2 \times G2(C') + c_3 \times G3(C') + c_4 \times P(H(C')) + c_5 \times X + c_6 \times y + c_7 \times B + offsetChroma$$

$$H(T'(x, y)) = [DL(x-1, y-1) + 2 \times DL(x, y-1) + DL(x+1, y-1) + DL(x-1, y) + 2 \times DL(x, y) + DL(x+1, y) + 4)] \gg 3$$

$$G_1(T'(x, y)) = [DL(x-1, y-1) - DL(x+1, y-1) + DL(x-1, y) - DL(x+1, y) + 4]$$

$$G_2(T'(x, y)) = [DL(x-1, y-1) + 2 \times DL(x, y-1) + DL(x+1, y-1) - DL(x-1, y) - 2 \times DL(x, y) - DL(x+1, y) + 4]$$

$$G_3\left(T'^{(x,y)}\right) = [-DL(x-1, y-1) + DL(x, y-1) + 2 \times DL(y+1, y-1) - 2 \times DL(x-1, y) - DL(x, y) + DL(x+1, y) + 4]$$

where the coefficients $c_0$-$c_7$ are seven filter coefficients for the luma spatial sample terms, the non-linear term P, the bias term B, and the coordinate terms X and Y, and predChromaVal may be a predicted chroma sample located at a sample position (x, y) relative to the top-left chroma sample of the block unit 410. In addition, P may be the non-linear term P(Q) equal to (Q×Q+midVal)>>bitDepth, and B may be the bias term equal to $2^{bitDepth-1}$. The parameter midVal and the bias term B of the cross-component candidate having the down-sampling filters may be identical to those of the above cross-component candidate having five luma spatial sample terms.

In some implementations, the parameter Q in the non-linear term P may be H(C'), and the value C' may be generated by subtracting the sample C by a luma offset value. L(u,v) may be a luma value located at a sample position (u,v) relative to a top-left luma sample of the block unit 410 and corresponding to the sample position (x,y). DL(m,n) may be a down-sampled luma value located at a sample position (m, n) relative to the top-left chroma sample of the block unit 410 and corresponding to the sample position (x,y). The coordinates (u,v) may be determined based on the video format. For example, when the video format YUV420, the width scaling factor and the height scaling factor may be both equal to 2. Thus, the coordinates (u,v) may be associated with the scaled position (2x,2y). It should be noted that the cross-component candidates may be changed without departing from the scope of the present disclosure.

Referring back to FIG. 3, at block 350, the decoder module 124 may reconstruct the block unit based on the predicted chroma block.

With reference to FIGS. 1 and 2, in some implementations, the decoder module 124 may determine multiple chroma residual components of a chroma residual block from the bitstream for the block unit and add the residual components into the predicted chroma block to reconstruct the block unit. With reference to FIG. 5A-5C, at blocks 552-554, the chroma residual block may be added to the predicted chroma block to generate a reconstructed chroma block 5122, 5123, or 5124.

In some other implementations, the decoder module 124 may weightedly combine the predicted chroma block and the chroma prediction block based on multiple weighting parameters to generate a weighted block. The weighting parameters may be predefined and fixed in the decoder module 124 and the encoder module 114. For example, the weighting parameter of the predicted chroma block may be predefined to be equal to 0.75, and the weighting parameter of the chroma prediction block may be predefined to be equal to 0.25. In some implementations, a CCRM weighting flag may be determined from the bitstream to indicate whether to weightedly combine the predicted chroma block and the chroma prediction block. Thus, the CCRM weighting flag equal to one may specify that the block unit is reconstructed based on the combination of the predicted chroma block and the chroma prediction block of the block unit. The decoder module 124 may reconstruct the block unit based on the weighted block. The decoder module 124 may determine the chroma residual components of the chroma residual block from the bitstream for the block unit and add the chroma residual components into the weighted block to reconstruct the block unit.

The decoder module 124 may reconstruct all of the other block units in the image frame for reconstructing the image frame and the video. The method/process 300 may then end.

Figure 6:
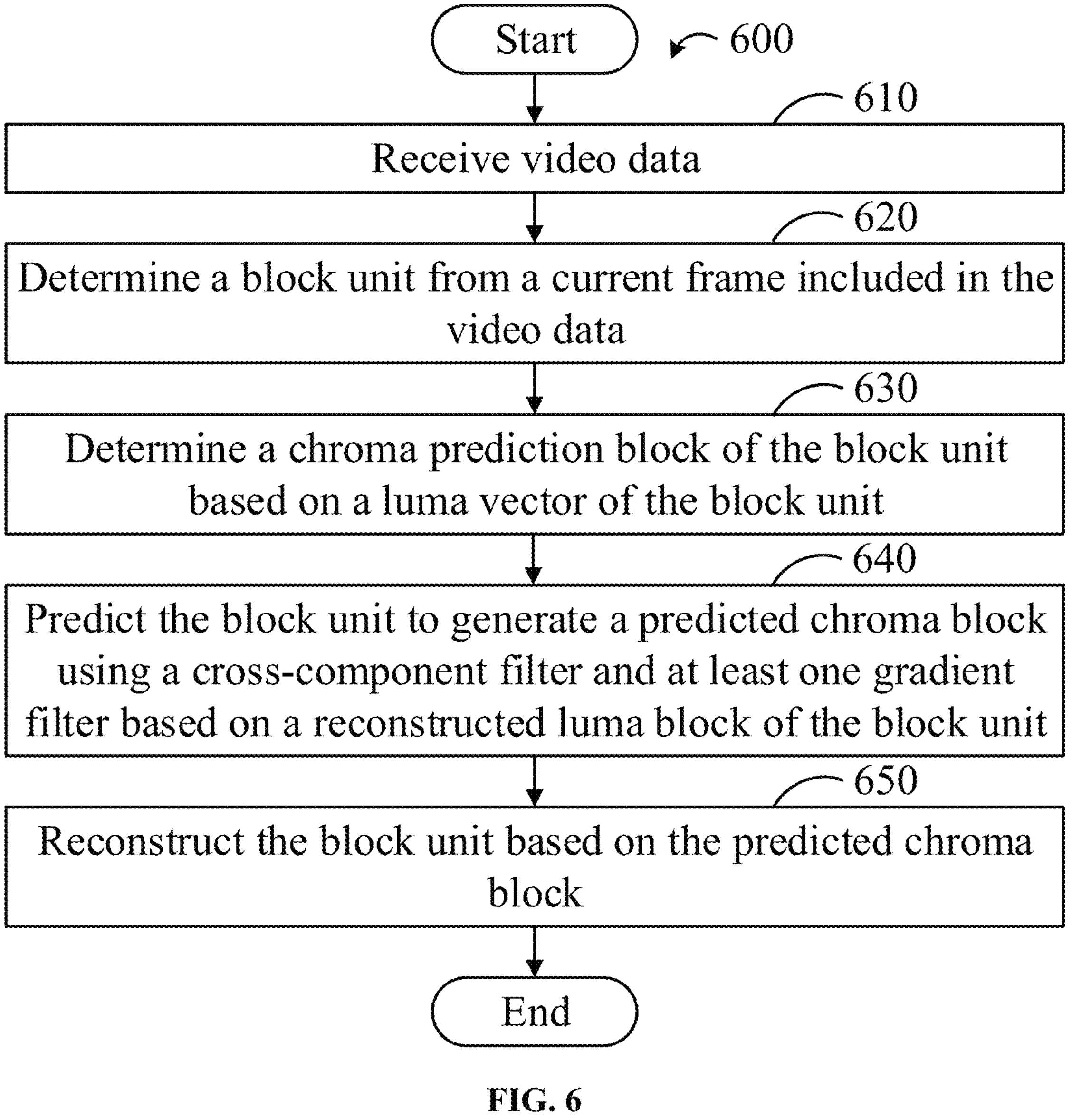
FIG. 6 is a flowchart illustrating a method/process for decoding and/or encoding video data by an electronic device, in accordance with one or more example implementations of this disclosure.

FIG. 6 is a flowchart illustrating a method/process 600 for decoding and/or encoding video data by an electronic device, in accordance with one or more example implementations of this disclosure. The method/process 600 is an example implementation, as there may be a variety of mechanisms of decoding the video data.

The method/process 600 may be performed by an electronic device using the configurations illustrated in FIGS. 1 and/or 2, where various elements of these figures may be referenced to describe the method/process 600. Each block illustrated in FIG. 6 may represent one or more processes, methods, or subroutines performed by an electronic device.

The order in which the blocks appear in FIG. 6 is for illustration only, and may not be construed to limit the scope of the present disclosure, thus the order may be different from what is illustrated. Additional blocks may be added or fewer blocks may be utilized without departing from the scope of the present disclosure.

At block 610, the method/process 600 may start by receiving (e.g., via the decoder module 124, as shown in FIG. 2) the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126.

At block 620, the decoder module 124 may determine a block unit from a current frame included in the video data.

With reference to FIGS. 1 and 2, the decoder module 124 may determine the image frames included in the bitstream when the video data received by the decoder module 124 includes the bitstream. The current frame may be one of the image frames determined according to the bitstream. The decoder module 124 may further divide the current frame to determine the block unit according to the partition indications in the bitstream. In some implementations, the decoder module 124 may divide the current frame to generate multiple CTUs, and may further divide a current CTU included in the CTUs to generate multiple divided blocks and to determine the block unit from the divided blocks, according to the partition indications (e.g., based on any video coding standard). In some other implementations, the decoder module 124 may divide the current frame to generate multiple slices, and further divide a current slice included in the slices to generate multiple CTUs. In addition, the decoder module 124 may further divide a current CTU included in the CTUs to generate multiple divided blocks and to determine the block unit from the divided blocks, according to the partition indications. The size of the block unit may be Wb×Hb. In some implementations, each of the Wb and Hb may be a positive integer (e.g., 4, 8, etc.) that may be equal to, or different from, each other.

The image frames may include multiple inter-frames and multiple intra-frames. In some implementations, the current frame may be one of the inter-frames in the image frames. In other words, the divided blocks in the current frame may be intra-predicted or inter-predicted for reconstructing the current frame. In addition, the current frame may be different from the intra-frames, since an inter prediction may not be available for the intra-frame. In some implementations, the current slice including the block unit may be an inter-slice included in the slices of the current frame.

At block 630, the decoder module 124 may determine a chroma prediction block of the block unit based on a luma vector of the block unit.

With reference to FIGS. 4A and 4B, since the luma block unit 411 may be reconstructed prior to the reconstruction of the chroma block unit 412, the luma vector 4100 may be determined for predicting and reconstructing the luma block unit 411 of the block unit 410 prior to the reconstruction of the chroma block unit 412.

In some implementations, the reference block 420, as shown in FIG. 4A, may be determined from the current frame, where the current frame may be one of the inter-frames. In addition, the luma vector 4100 of the block unit 410 is a luma block vector, having a direction from the block unit 410 to the reference block 420 in the current frame. In some implementations, the luma block vector may be determined based on one of a luma intra block copy (IBC) vector and an intra template matching prediction (IntraTMP) mode. In some other implementations, the reference block 420, as shown in FIG. 4B, may be determined from a reference frame, different from the current frame, where the current frame may be one of the inter-frames. In addition, the luma vector 4100 of the block unit 410 is a luma motion vector, having a direction from a co-located block 4101 of the block unit 410 to the reference block 420. The co-located block in the reference frame may be co-located with the block unit in the current frame. In some implementations, the luma motion vector may be searched from a motion search range by the encoder module 114 and provided from the encoder module 114 to the decoder module 124 though the bitstream when the luma block unit 411 is reconstructed in a luma inter mode. In some other implementations, the luma motion vector may be inherited from a luma neighboring vector of other reconstructed block when the luma block unit 411 is reconstructed in a luma inter merge mode. In some implementations, the block unit may be included in the inter-slice of the current frame.

Since the reference block 420 may be reconstructed prior to the reconstruction of the block unit 410, the luma reference unit 421 and the chroma reference unit 422 may be reconstructed prior to the reconstruction of the block unit 410. Thus, a luma reconstruction block of the luma reference unit 421 and a chroma reconstruction block of the chroma reference unit 422 in the reference block 420 may be determined for predicting and/or reconstructing the block unit 410. The luma reconstruction block of the luma reference unit 421 in the reference block 420 may be determined as a luma prediction block of the block unit 410 for predicting and/or reconstructing the chroma block unit 412 of the block unit 410. In addition, the chroma reconstruction block of the chroma reference unit 422 in the reference block 420 may be determined as a chroma prediction block of the block unit 410 for predicting and/or reconstructing the chroma block unit 412 of the block unit 410. Thus, the luma prediction block and the chroma prediction block of the block unit 410 generated by the luma reconstruction block of the luma reference unit 421 and the chroma reconstruction block of the chroma reference unit 422 may be determined based on the luma vector 4100 of the block unit 410.

Furthermore, the chroma block unit 412 may further include a Cr block unit and a Cb block unit, and the chroma reference unit 422 may further include a Cr reference unit and a Cb reference unit. In some implementations, the chroma prediction block of the block unit 410 generated from the chroma reconstruction block of the chroma reference unit 422 may be a Cr reconstruction block of the chroma reference unit 422 determined based on the luma vector 4100 of the block unit 410. In some other implementations, the chroma prediction block of the block unit 410 generated from the chroma reconstruction block of the chroma reference unit 422 may be a Cb reconstruction block of the chroma reference unit 422 determined based on the luma vector 4100 of the block unit 410.

The determination of the chroma prediction block based on the luma vector in the method/process 600 may be identical to that in the method/process 300.

Referring back to FIG. 6, at block 640, the decoder module 124 may predict the block unit 410 to generate a predicted chroma block using a cross-component filter and at least one gradient filter based on a reconstructed luma block of the block unit 410.

With reference to FIGS. 1 and 2, in some implementations, the decoder module 124 may derive the cross-component filter based on the luma prediction block and the chroma prediction block of the block unit 410 using the at least one gradient filter. In addition, the luma prediction block of the block unit 410 may be added to a luma residual block of the block unit 410 to generate the reconstructed luma block of the block unit 410. The decoder module 124 may then predict the block unit 410 to generate the predicted chroma block using the derived cross-component filter and the at least one gradient filter based on the reconstructed luma block of the block unit 410.

In some other implementations, the decoder module 124 may derive the cross-component filter based on the luma prediction block and the chroma prediction block of the block unit 410 using at least one down-sampling filter and the at least one gradient filter. In addition, the luma prediction block of the block unit 410 may be added to the luma residual block of the block unit 410 to generate the reconstructed luma block of the block unit 410. The decoder module 124 may then predict the block unit 410 to generate the predicted chroma block using the derived cross-component filter, the at least one down-sampling filter, and the at least one gradient filter based on the reconstructed luma block of the block unit 410.

In some implementations, the decoder module 124 may select one of multiple cross-component candidates for deriving the cross-component filter. The cross-component candidates may be stored in the encoder module 114 and the decoder module 124. Thus, the encoder module 114 may add a cross-component index to the bitstream for indicating the selected cross-component candidate. In addition, the decoder module 124 may extract the cross-component index from the bitstream by parsing the bitstream for determining the selected cross-component candidate. The number of cross-component candidates may be a positive integer greater than one. The cross-component index may be one of multiple block level indices, included in the bitstream, for indicating the selected cross-component candidate. The decoder 124 may then derive multiple filter coefficients of the selected cross-component candidate based on the luma prediction block and the chroma prediction block of the block unit 410 to determine the cross-component filter. In some implementations, the filter coefficients may be derived based on the luma prediction block and the chroma prediction block of the block unit 410 using LDL-decomposition-based MSE minimization method.

In some other implementations, the encoder module 114 and the decoder module 124 may store only one cross-component candidate. Thus, the encoder module 114 may directly use the cross-component candidate to derive the cross-component filter without adding the cross-component index to the bitstream. In addition, the decoder module 124 may also directly use the cross-component candidate to derive the cross-component filter without extracting the cross-component index from the bitstream.

The Cr block unit and the Cb block unit of the chroma block unit 412 may be respectively predicted and reconstructed. Thus, in some implementations, the bitstream may include two cross-component indices, each for one of the Cr block unit and the Cb block unit when the number of cross-component candidates is greater than one. In some other implementations, the bitstream may include only one cross-component index for both the Cr block unit and the Cb block unit when the number of cross-component candidates is greater than one. In yet some other implementations, the bitstream may include no cross-component index for the Cr block unit and the Cb block unit when the encoder module 114 and the decoder module 124 store only one cross-component candidate. Since the Cr block unit used to derive a Cr cross-component filter is different from the Cb block unit used to derive a Cb cross-component filter, the filter coefficients of the Cr cross-component filter may be different from those of the Cb cross-component filter. Thus, even if the selected cross-component candidate of the Cr block unit is identical to that of the Cb block unit, the Cr block unit and the Cb block unit may have different cross-component filters.

In some implementations, a filter type of one of the cross-component candidates may be a linear equation. The linear equation may include Ng gradient terms and one bias term B. The number Ng may be a positive integer, such as 1, 2, 3, or 4. In some implementations, the linear equation may further include Ns luma spatial sample terms. The number Ns may be a positive integer, such as 1, 3, 5, 7, or 9. Thus, two of the cross-component candidates may be shown in the following functions:

$$predChromaVal = c_0 \times G_0 + \ldots + c_n \times G_n + B$$

$$predChromaVal = c_0 \times G + c_1 \times L + c_2 \times B$$

where the coefficients $c_0$-$c_n$ are (n+1) filter coefficients for the at least one gradient term, the spatial sample term L, and the bias term B, and predChromaVal may be a predicted chroma sample located at a sample position (x, y) relative to a top-left chroma sample of the block unit 410. In addition, P may be the non-linear term P(Q) equal to (Q×Q+midVal) >>bitDepth, and B may be the bias term equal to $2^{bitDepth-1}$. The parameter bitDepth may be a bit depth of the samples in the bitstream. For example, the bias term B may be set as 512 for 10 bits content.

In some other implementations, the filter type of one of the cross-component candidates may be a quadratic equation. The quadratic equation may include Ns luma spatial sample terms, Ng gradients, Np non-linear terms P, Nc coordinate terms X and Y, and one bias term B. The number Ns may be a positive integer, such as 1, 3, 5, 7, or 9. In some implementations, the luma spatial sample terms may include a center sample C, a north sample N, a south sample S, a west sample W, an east sample E, a northwest sample NW, and a southeast sample SE. Thus, four of the cross-component candidates may be shown in the following functions:

$$predChromaVal = c_0 \times C + c_1 \times G_y + c_2 \times G_x + c_3 \times Y + c_4 \times X + c_5 \times P + c_6 \times B$$

$$predChromaVal = c_0 \times C + c_1 \times N + c_2 \times S + c_3 \times G(C) + c_4 \times G(N) + c_5 \times G(S) + c_6 \times P(C) + c_7 \times P(N) + c_8 \times P(S) + c_9 \times Y + c_{10} \times B$$

$$predChromaVal = c_0 \times C + c_1 \times W + c_2 \times E + c_3 \times G(C) + c_4 \times G(W) + c_5 \times G(E) + c_6 \times P(C) + c_7 \times P(W) + c_8 \times P(E) + c_9 \times Y + c_{10} \times B$$

$$predChromaVal = c_0 \times C + c_1 \times NW + c_2 \times SE + c_3 \times G(C) + c_4 \times G(NW) + c_5 \times G(SE) + c_6 \times P(C) + c_7 \times P(NW) + c_8 \times P(SE) + c_9 \times Y + c_{10} \times B$$

where the coefficients $c_0$-$c_{10}$ are eleven filter coefficients for the Ns luma spatial sample terms, Ng gradients, Np non-linear terms P, Nc coordinate terms X and Y, and one bias term B, and predChromaVal may be a predicted chroma sample located at a sample position (x, y) relative to a top-left chroma sample of the block unit 410. In addition, P may be the non-linear term P(Q) equal to (Q×Q+midVal) >>bitDepth, and B may be the bias term equal to $2^{bitDepth-1}$. The parameter midVal and the bias term B may be set as to a middle luma value, the parameter bitDepth may be a bit depth of the samples in the bitstream. For example, the bias term B may be set as 512 for 10 bits content.

The determination of the selected cross-component candidate in the method/process 600 may be identical to that in the method/process 300. Furthermore, the derivation of the filter coefficients of the cross-component filter in the method/process 600 may be identical to that in the method/process 300. It should be noted that the determination of the selected cross-component candidate and the derivation of the filter coefficients of the cross-component filter may be changed without departing from the scope of the present disclosure.

In some implementations, the decoder module 124 may select one of multiple gradient candidates, as the gradient filter. The gradient candidates may be stored in the encoder module 114 and the decoder module 124. Thus, the encoder module 114 may add a gradient index to the bitstream for indicating the selected gradient candidate. In addition, the decoder module 124 may extract the gradient index from the bitstream by parsing the bitstream for determining the selected gradient candidate. The number of gradient candidates may be a positive integer greater than one. The gradient index may be one of the block level indices, included in the bitstream, for indicating the selected gradient candidate.

In some other implementations, the encoder module 114 and the decoder module 124 may store only one gradient candidate. Thus, the encoder module 114 may directly use the gradient candidate, as the gradient filter, without adding the gradient index to the bitstream. In addition, the decoder module 124 may also directly use the gradient candidate, as the gradient filter, without extracting the gradient index from the bitstream.

The Cr block unit and the Cb block unit of the chroma block unit 412 may be respectively predicted and reconstructed. Thus, in some implementations, the bitstream may include two gradient indices, each for one of the Cr block unit and the Cb block unit when the number of gradient candidates is greater than one. In some other implementations, the bitstream may include only one gradient index for both the Cr block unit and the Cb block unit when the number of gradient candidates is greater than one. In yet some other implementations, the bitstream may include no gradient index for the Cr block unit and the Cb block unit when the encoder module 114 and the decoder module 124 store only one gradient candidate.

In some implementations, when the video format is YUV420, some gradient candidates may be shown in the following functions:

$$G(x, y) = L(2x-1, 2y-1) - L(2x+1, 2y-1) + L(2x-1, 2y) - L(2x+1, 2y)$$

$$G(x, y) = L(2x-1, 2y-1) + 2 \times L(2x, 2y-1) + L(2x+1, 2y-1) - L(2x-1, 2y) - 2 \times L(2x, 2y) - L(2x+1, 2y)$$

$$G(x, y) = 2 \times L(2x-1, 2y-1) + L(2x, 2y-1) - L(2x+1, 2y-1) + L(2x-1, 2y) - L(2x, 2y) - 2 \times L(2x+1, 2y)$$

$$G(x, y) = -L(2x-1, 2y-1) + L(2x, 2y-1) + 2 \times L(2x+1, 2y-1) - 2 \times L(2x-1, 2y) - L(2x, 2y) + L(2x+1, 2y)$$

where G(x,y) may be a gradient value located at a sample position (x,y) relative to a top-left chroma sample of the block unit 410 and L(u,v) may be a luma value located at a sample position (u,v) relative to a top-left luma sample of the block unit 410 and corresponding to the sample position (x,y). The coordinates (u,v) may be determined based on the video format. For example, when the video format YUV420, the width scaling factor and the height scaling factor may be both equal to 2. Thus, the coordinates (u,v) may be associated with a scaled position (2x,2y).It should be noted that the gradient candidates may be changed without departing from the scope of the present disclosure.

Multiple luma values of the block unit 410 may be applied to the gradient filter to generate multiple gradient values of a luma block unit 411. In some implementations, when the luma prediction block of the block unit is applied to the gradient filter, the gradient values of the luma block unit 411 may be multiple gradient prediction values of the luma prediction block. In some other implementations, when the reconstructed luma block of the block unit is applied to the gradient filter, the gradient values of the luma block unit 411 may be multiple gradient reconstruction values of the reconstructed luma block.

Figure 7A:
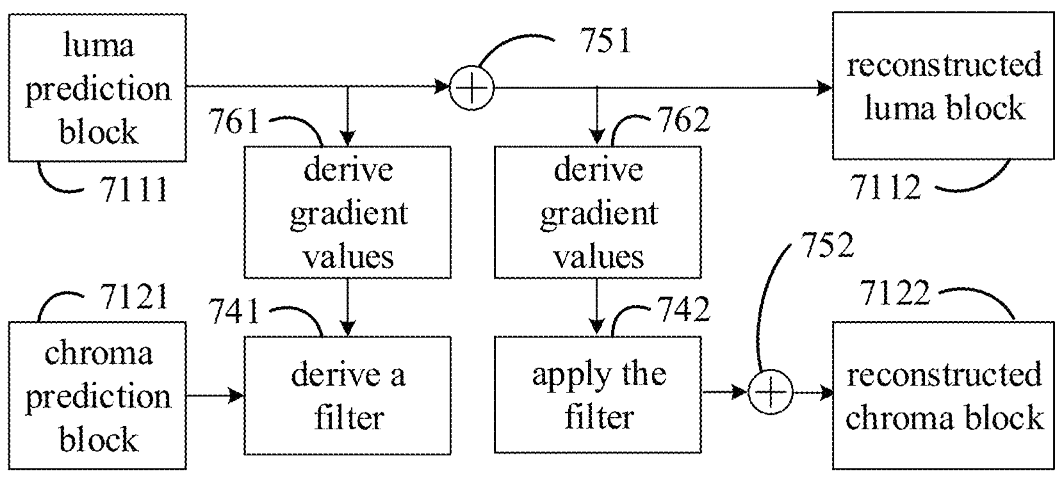
FIGS. 7A and 7B are schematic illustrations of the prediction of the chroma block unit using the cross-component filter and at least one gradient filter, in accordance with one or more example implementations of this disclosure.
Figure 7B:
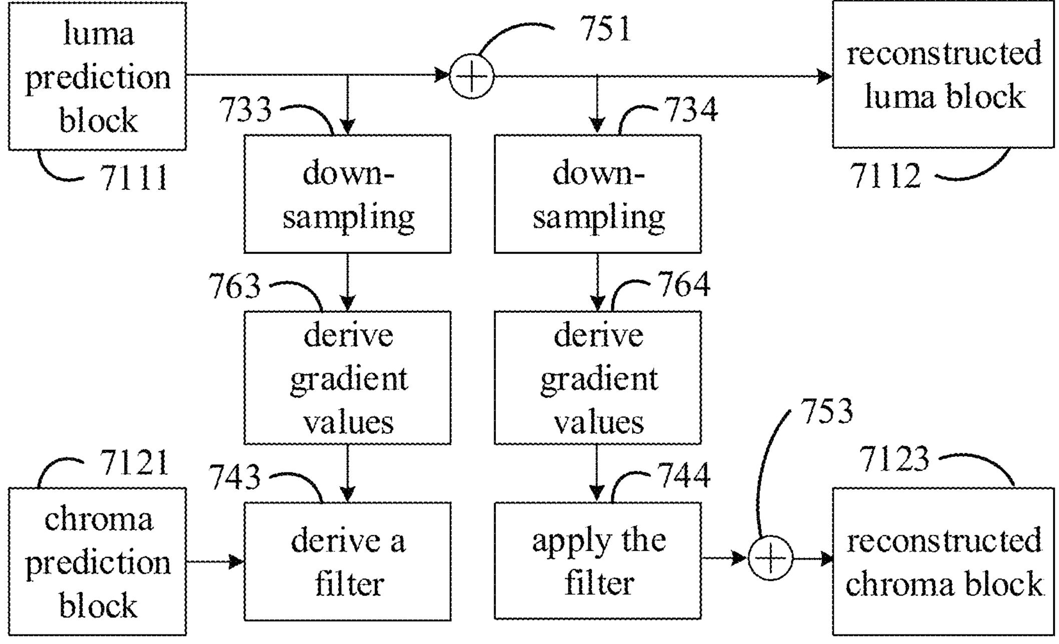

FIGS. 7A and 7B are schematic illustrations of the prediction of the chroma block unit using the cross-component filter and at least one gradient filter, in accordance with one or more example implementations of this disclosure. FIG. 7A illustrates a prediction of the chroma block unit using two gradient filters. In some implementations, the gradient filters at block 761 and block 762 may be identical. With reference to FIGS. 4A and 4B, at block 761, the luma prediction block 7111 of the luma block unit 411 may be applied to the gradient filter to derive the gradient prediction values of the luma prediction block 7111.

At block 741, the luma prediction block and the gradient prediction block of the luma block unit 411 and the chroma prediction block 7121 of the chroma block unit 412 may be used to derive multiple filter coefficients of the selected cross-component candidate to generate the cross-component filter. Comparing the derivation of the cross-component filter in FIG. 7A with that of shown in FIG. 5A, samples in the luma prediction block 7111 of the luma block unit 411 may be directly used to derive the cross-component filter. In other words, the derived cross-component filter may be generated directly based on the luma prediction block 7111 of the luma block unit 411 without using the down-sampling filter.

However, the size of the luma prediction block 7111 of the luma block unit 411 may be different from the size of the chroma block unit 412. Thus, the luma prediction block 7111 of the luma block unit 411 may be subsampled for deriving the cross-component filter. For example, when the video format is YUV420, the spatial samples, subsampled from the luma prediction block 7111 of the luma block unit 411, may be located, respectively, at the luma locations (2x, 2y), (2x−1, 2y), (2x+1, 2y), (2x, 2y+1), (2x, 2y−1), (2x−1, 2y−1), (2x+1, 2y+1) corresponding to the chroma sample location (x, y). The luma locations (u,v) may be determined based on the video format. For example, when the video format YUV420, the luma locations may be associated with the scaled position (2x,2y). In some implementations, the luma locations (u,v) of the center sample C, the north sample N, the south sample S, the west sample W, the cast sample E, the northwest sample NW, and the southeast sample SE may correspond to the chroma sample location (x, y) based on the video format.

At block 751, the luma prediction block 7111 of the luma block unit 411 may be added to the luma residual block of the luma block unit 411 to generate the reconstructed luma block 7112 of the luma block unit 411. At block 762, the reconstructed luma block 7112 of the luma block unit 411 may be further applied to the gradient filter to generate the gradient reconstruction values of the reconstructed luma block 7112. At block 742, the reconstructed luma block and the gradient reconstruction block of the luma block unit 411 may be applied to the derived cross-component filter to generate the predicted chroma block of the chroma block unit 412. Comparing the generation of the predicted chroma block of the chroma block unit 412 of the chroma block unit 412 in FIG. 7A with that of shown in FIG. 5A, samples in the reconstructed luma block 7112 of the luma block unit 411 may be directly applied to the derived cross-component filter to generate the predicted chroma block of the chroma block unit 412. In other words, the predicted chroma block of the chroma block unit 412 may be generated from the reconstructed chroma block 7112 of the luma block unit 411 without using the down-sampling filter.

However, the size of the reconstructed luma block 7112 of the luma block unit 411 may be different from the size of the chroma block unit 412. Thus, the reconstructed luma block 7112 of the luma block unit 411 may be subsampled for applying to the generated cross-component filter. For example, when the video format is YUV420, the spatial samples, subsampled from the luma prediction block 7111 of the luma block unit 411, may be located, respectively, at the luma locations (2x, 2y), (2x−1, 2y), (2x+1, 2y), (2x, 2y+1), (2x, 2y−1), (2x−1, 2y−1), (2x+1, 2y+1) corresponding to the chroma sample location (x, y). The luma locations (u,v) may be determined based on the video format. For example, when the video format YUV420, the luma locations (u,v) may be associated with the scaled position (2x,2y).

FIG. 7B illustrates another prediction of the chroma block unit 412 two down-sampling filters and two gradient filters. In some implementations, the down-sampling filters at block 733 and block 734 may be identical, and the gradient filters at block 763 and block 764 may be identical. With reference to FIGS. 4A and 4B, at block 733, the luma prediction block 7111 of the luma block unit 411 may be down-sampled by the down-sampling filter to generate a down-sampled prediction block of the luma block unit 411. The generation of at least one down-sampling candidates for the down-sampling in the method/process 600 may be identical to that in the method/process 300. In addition, the selection of the down-sampling filter from at least one down-sampling candidates in the method/process 600 may be identical to that in the method/process 300. Furthermore, the generation of the down-sampled prediction block in the method/process 600 may be identical to that in the method/process 300.

At block 763, in some implementations, the luma prediction block 7111 of the luma block unit 411 may be applied to the gradient filter to generate the gradient prediction values of the luma prediction block 7111. Thus, the generation of the gradient prediction block in FIG. 7B may be identical to that of shown in FIG. 7A. In some other implementations, the down-sampled prediction block of the luma block unit 411 may be applied to the gradient filter to generate multiple gradient prediction values of the luma prediction block 7111. Thus, the generation of the gradient prediction block in FIG. 7B may be different from that of shown in FIG. 7A. Since the size of the down-sampled prediction block of the luma block unit 411 is identical to the size of the chroma block unit 412, the luma prediction sample L(u,v) in the gradient candidates may be changed, as the down-sampled luma prediction sample D(x,y) corresponding to a sample position (x,y) relative to a top-left chroma sample of the block unit 410. It should be noted that the down-sampling candidates may be changed without departing from the scope of the present disclosure.

At block 743, the down-sampled prediction block and the gradient prediction block of the luma block unit 411 and the chroma prediction block 7121 of the chroma block unit 412 may be used to derive multiple filter coefficients of the selected cross-component candidate to generate the cross-component filter. Since the sizes of the down-sampled prediction block and the gradient prediction block of the luma block unit 411 are identical to the size of the chroma block unit 412, the down-sampled prediction block and the gradient prediction block of the luma block unit 411 and the chroma prediction block 4121 of the chroma block unit 412 may be allowed to derive the generated cross-component filter.

At block 751, the luma prediction block 7111 of the luma block unit 411 may be added to the luma residual block of the luma block unit 411 to generate the reconstructed luma block 7112 of the luma block unit 411. At block 734, the reconstructed luma block 7112 of the luma block unit 411 may be down-sampled by the down-sampling filter to generate a down-sampled reconstruction block of the luma block unit 411. The down-sampling filter at block 734 may be identical to that at block 733.

At block 764, in some implementations, the reconstructed luma block 7112 of the luma block unit 411 may be applied to the gradient filter to generate the gradient reconstruction values of the reconstructed luma block 7112. Thus, the generation of the gradient reconstruction block in FIG. 7B may be identical to that of shown in FIG. 7A. In some other implementations, the down-sampled reconstruction block of the luma block unit 411 may be applied to the gradient filter to generate multiple gradient reconstruction values of the reconstructed luma block 7112. Thus, the generation of the gradient reconstruction block in FIG. 7B may be different from that of shown in FIG. 7A. Since the size of the down-sampled reconstruction block of the luma block unit 411 is identical to the size of the chroma block unit 412, the luma reconstruction sample L(u,v) in the gradient candidates may be changed, as the down-sampled luma reconstruction sample D(x,y) corresponding to the sample position (x,y) relative to the top-left chroma sample of the block unit 410. It should be noted that the down-sampling candidates may be changed without departing from the scope of the present disclosure.

At block 744, the down-sampled reconstruction block and the gradient reconstruction block of the luma block unit 411 may be applied to the generated cross-component filter to generate the predicted chroma block of the chroma block unit 412. Since the sizes of the down-sampled reconstruction block and the gradient reconstruction block are identical to the size of the chroma block unit 412, the down-sampled reconstruction block and the gradient reconstruction block of the luma block unit 411 may be allowed to generate the predicted chroma block of the chroma block unit 412 using the generated cross-component filter.

With reference to FIGS. 7A and 7B, the gradient filter may be used prior to the derivation of the cross-component filter. In addition, the gradient filter may be used prior to the usage of the cross-component filter. In some implementations, the gradient filter may be merged into the cross-component filter. In other words, the gradient filter and the cross-component filter may be calculated at the same times. In some other implementations, when the down-sampling filter is also used for generating the reconstructed chroma block 7122, the gradient filter and the down-sampling filter may be merged into the cross-component filter.

In yet some other implementations, more than one gradient filter may be merged into a cross-component filter. The gradient filters in the cross-component filter may be different from each other.

In some implementations, the luma values (e.g., the luma prediction block 7111 and the reconstructed luma block 7112) may be classified into two luma groups based on a mean value of the luma values. In addition, each of the gradient values may correspond to one of the luma values. Thus, each of the gradient values may also be classified into two gradient groups based on the relationship between a corresponding one of the luma values and the mean value of the luma values. When the decoder module 124 derives two cross-component filters based on the two luma groups and the two gradient groups, and the decoder module 124 may predict the block unit 410 to generate the predicted chroma block using the two cross-component filters based on the two luma groups and the two gradient groups.

Referring back to FIG. 6, at block 650, the decoder module 124 may reconstruct the block unit based on the predicted chroma block.

With reference to FIGS. 1 and 2, in some implementations, the decoder module 124 may determine multiple chroma residual components of a chroma residual block from the bitstream for the block unit and add the residual components into the predicted chroma block to reconstruct the block unit. With reference to FIGS. 7A and 7B, at blocks 752 and 753, the chroma residual block may be added to the predicted chroma block to generate a reconstructed chroma block 7122 or 7123.

In some other implementations, the decoder module 124 may weightedly combine the predicted chroma block and the chroma prediction block based on multiple weighting parameters to generate a weighted block. For example, a weighting parameter of the predicted chroma block may be predefined to be equal to 0.75, and a weighting parameter of the chroma prediction block may be predefined to be equal to 0.25. The generation of the weighted block in the method/process 600 may be identical to that in the method/process 300. The decoder module 124 may reconstruct the block unit based on the weighted block. The decoder module 124 may add the chroma residual components into the weighted block to reconstruct the block unit.

The decoder module 124 may reconstruct all of the other block units in the image frame for reconstructing the image frame and the video. The method/process 600 may then end.

Figure 8:
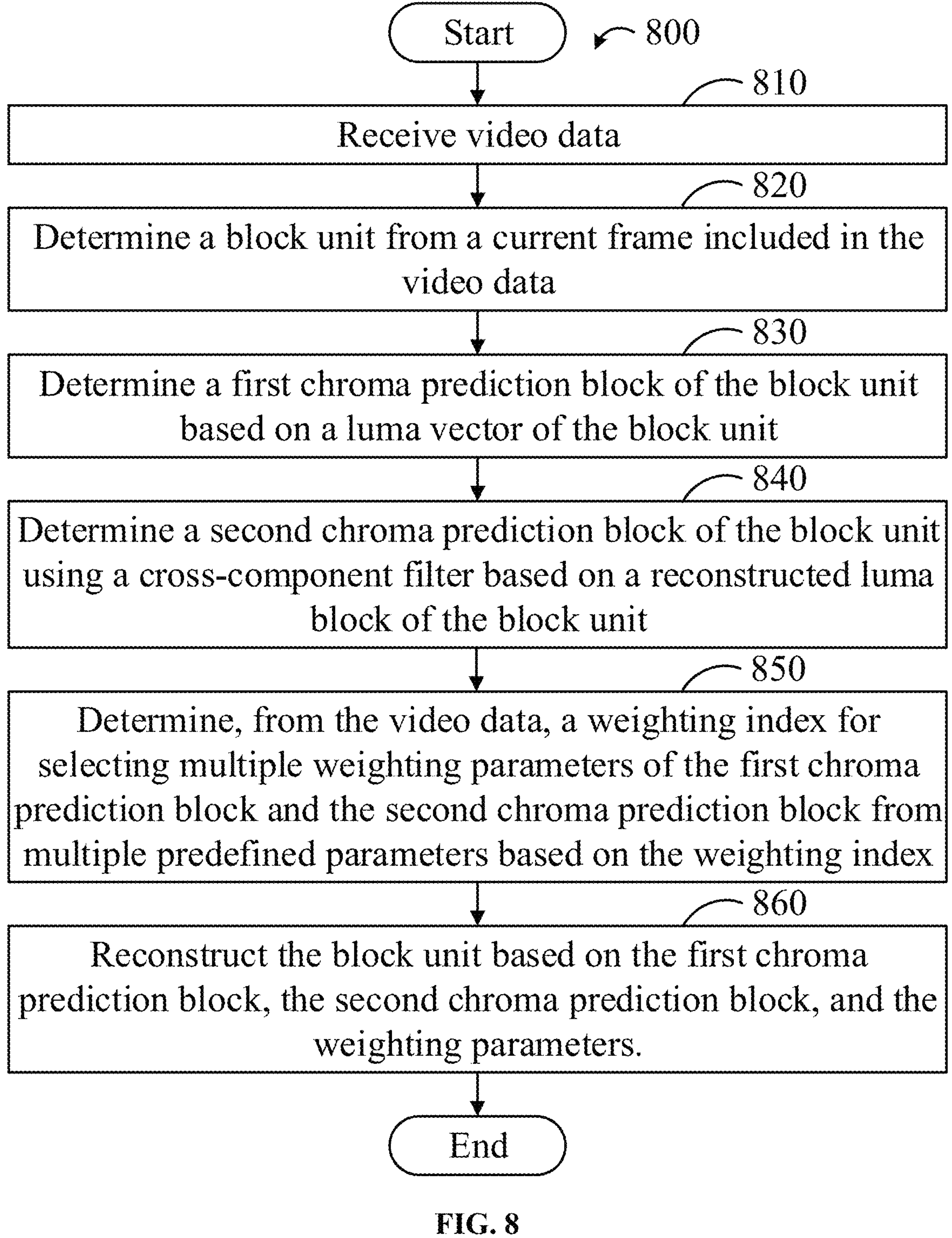
FIG. 8 is a flowchart illustrating a method/process for decoding and/or encoding video data by an electronic device, in accordance with one or more example implementations of this disclosure.

FIG. 8 is a flowchart illustrating a method/process 800 for decoding and/or encoding video data by an electronic device, in accordance with one or more example implementations of this disclosure. The method/process 800 is an example implementation, as there may be a variety of mechanisms of decoding the video data.

The method/process 800 may be performed by an electronic device using the configurations illustrated in FIGS. 1 and/or 2, where various elements of these figures may be referenced to describe the method/process 800. Each block illustrated in FIG. 8 may represent one or more processes, methods, or subroutines performed by an electronic device.

The order in which the blocks appear in FIG. 8 is for illustration only, and may not be construed to limit the scope of the present disclosure, thus the order may be different from what is illustrated. Additional blocks may be added or fewer blocks may be utilized without departing from the scope of the present disclosure.

At block 810, the method/process 800 may start by receiving (e.g., via the decoder module 124, as shown in FIG. 2) the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126.

At block 820, the decoder module 124 may determine a block unit from a current frame included in the video data.

With reference to FIGS. 1 and 2, the decoder module 124 may determine the image frames included in the bitstream when the video data received by the decoder module 124 includes the bitstream. The current frame may be one of the image frames determined according to the bitstream. The decoder module 124 may further divide the current frame to determine the block unit according to the partition indications in the bitstream. In some implementations, the decoder module 124 may divide the current frame to generate multiple CTUs, and may further divide a current CTU included in the CTUs to generate multiple divided blocks and to determine the block unit from the divided blocks, according to the partition indications (e.g., based on any video coding standard). In some other implementations, the decoder module 124 may divide the current frame to generate multiple slices, and further divide a current slice included in the slices to generate multiple CTUs. In addition, the decoder module 124 may further divide a current CTU included in the CTUs to generate multiple divided blocks and to determine the block unit from the divided blocks, according to the partition indications. The size of the block unit may be Wb×Hb. In some implementations, each of the Wb and Hb may be a positive integer (e.g., 4, 8, etc.) that may be equal to, or different from, each other.

The image frames may include multiple inter-frames and multiple intra-frames. In some implementations, the current frame may be one of the inter-frames in the image frames. In other words, the divided blocks in the current frame may be intra-predicted or inter-predicted for reconstructing the current frame. In addition, the current frame may be different from the intra-frames, since an inter prediction may not be available for the intra-frame. In some implementations, the current slice including the block unit may be an inter-slice included in the slices of the current frame.

At block 830, the decoder module 124 may determine a first chroma prediction block of the block unit based on a luma vector of the block unit.

With reference to FIGS. 4A and 4B, since the luma block unit 411 may be reconstructed prior to the reconstruction of the chroma block unit 412, the luma vector 4100 may be determined for predicting and reconstructing the luma block unit 411 of the block unit 410 prior to the reconstruction of the chroma block unit 412.

In some implementations, the reference block 420, as shown in FIG. 4A, may be determined from the current frame, where the current frame may be one of the inter-frames. In addition, the luma vector 4100 of the block unit 410 is a luma block vector, having a direction from the block unit 410 to the reference block 420 in the current frame. In some implementations, the luma block vector may be determined based on one of a luma intra block copy (IBC) vector and an intra template matching prediction (IntraTMP) mode. In some other implementations, the reference block 420, as shown in FIG. 4B, may be determined from a reference frame, different from the current frame, and the current frame may be one of the inter-frames. In addition, the luma vector 4100 of the block unit 410 is a luma motion vector, having a direction from a co-located block 4101 of the block unit 410 to the reference block 420. The co-located block in the reference frame may be co-located with the block unit in the current frame. In some implementations, the luma motion vector may be searched from a motion search range by the encoder module 114 and provided from the encoder module 114 to the decoder module 124 though the bitstream when the luma block unit 411 is reconstructed in a luma inter mode. In some other implementations, the luma motion vector may be inherited from a luma neighboring vector of other reconstructed block when the luma block unit 411 is reconstructed in a luma inter merge mode. In some implementations, the block unit may be included in the inter-slice of the current frame.

Since the reference block 420 may be reconstructed prior to the reconstruction of the block unit 410, the luma reference unit 421 and the chroma reference unit 422 may be reconstructed prior to the reconstruction of the block unit 410. Thus, a luma reconstruction block of the luma reference unit 421 and a chroma reconstruction block of the chroma reference unit 422 in the reference block 420 may be determined for predicting and/or reconstructing the block unit 410. The luma reconstruction block of the luma reference unit 421 in the reference block 420 may be determined, as a luma prediction block of the block unit 410 for predicting and/or reconstructing the chroma block unit 412 of the block unit 410. In addition, the chroma reconstruction block of the chroma reference unit 422 in the reference block 420 may be determined, as the first chroma prediction block of the block unit 410, for predicting and/or reconstructing the chroma block unit 412 of the block unit 410. Thus, the luma prediction block and the first chroma prediction block of the block unit 410 generated by the luma reconstruction block of the luma reference unit 421 and the chroma reconstruction block of the chroma reference unit 422 may be determined based on the luma vector 4100 of the block unit 410.

Furthermore, the chroma block unit 412 may further include a Cr block unit and a Cb block unit, and the chroma reference unit 422 may further include a Cr reference unit and a Cb reference unit. In some implementations, the first chroma prediction block of the block unit 410 generated from the chroma reconstruction block of the chroma reference unit 422 may be a Cr reconstruction block of the chroma reference unit 422 determined based on the luma vector 4100 of the block unit 410. In some other implementations, the first chroma prediction block of the block unit 410 generated from the chroma reconstruction block of the chroma reference unit 422 may be a Cb reconstruction block of the chroma reference unit 422 determined based on the luma vector 4100 of the block unit 410.

The determination of the first chroma prediction block based on the luma vector in the method/process 800 may be identical to the determination of the chroma prediction block based on the luma vector in the method/process 300.

Referring back to FIG. 8, at block 840, the decoder module 124 may determine a second chroma prediction block of the block unit using a cross-component filter based on a reconstructed luma block of the block unit.

The determination of the second chroma prediction block at block 840 in the method/process 800 may be identical to the generation of the predicted chroma block at block 340 in the method/process 300. With reference to FIGS. 1, 2, and 4A, in some implementations, the decoder module 124 may derive the cross-component filter based on the luma prediction block and the first chroma prediction block of the block unit 410 using at least one down-sampling filter. In addition, the luma prediction block of the block unit 410 may be added to a luma residual block of the block unit 410 to generate the reconstructed luma block of the block unit 410. In some implementations, the decoder module 124 may then predict the block unit 410 to generate the second chroma prediction block using the derived cross-component filter and the at least one down-sampling filter based on the reconstructed luma block of the block unit 410. In some other implementations, the decoder module 124 may predict the block unit 410 to generate the second chroma prediction block only using the derived cross-component filter based on the reconstructed luma block of the block unit 410. In other words, the second chroma prediction block may be generated without using the at least one down-sampling filter.

In yet some other implementations, the decoder module 124 may derive the cross-component filter based on the luma prediction block and the first chroma prediction block of the block unit 410 without using the at least one down-sampling filter. In other words, the derivation of the cross-component filter may be unrelated to the at least one down-sampling filter. In addition, the luma prediction block of the block unit 410 may also be added to the luma residual block of the block unit 410 to generate the reconstructed luma block of the block unit 410. The decoder module 124 may then predict the block unit 410 to generate the second chroma prediction block using the derived cross-component filter and the at least one down-sampling filter based on the reconstructed luma block of the block unit 410.

The determination of the second chroma prediction block at block 840 in the method/process 800 may be identical to the generation of the predicted chroma block at block 640 in the method/process 600. In some implementations, the decoder module 124 may derive the cross-component filter based on the luma prediction block and the first chroma prediction block of the block unit 410 using at least one gradient filter. In addition, the luma prediction block of the block unit 410 may be added to a luma residual block of the block unit 410 to generate the reconstructed luma block of the block unit 410. The decoder module 124 may then predict the block unit 410 to generate the second chroma prediction block using the derived cross-component filter and the at least one gradient filter based on the reconstructed luma block of the block unit 410.

In some other implementations, the decoder module 124 may derive the cross-component filter based on the luma prediction block and the first chroma prediction block of the block unit 410 using at least one down-sampling filter and the at least one gradient filter. In addition, the luma prediction block of the block unit 410 may be added to the luma residual block of the block unit 410 to generate the reconstructed luma block of the block unit 410. The decoder module 124 may then predict the block unit 410 to generate the second chroma prediction block using the derived cross-component filter, the at least one down-sampling filter, and the at least one gradient filter based on the reconstructed luma block of the block unit 410.

Furthermore, the decoder module 124 may determine the second chroma prediction block of the block unit using a cross-component residual model (CCRM) based on the reconstructed luma block of the block unit. The decoder module 124 may sub-sample the luma prediction block of the block unit 410 to generate a sub-sampled prediction block of the block unit 410. The decoder module 124 may then derive the cross-component filter based on the sub-sampled prediction block and the first chroma prediction block of the block unit 410. In other words, the cross-component filter may be derived without using the at least one down-sampling filter and at least one gradient filter. In addition, the luma prediction block of the block unit 410 may be added to the luma residual block of the block unit 410 to generate the reconstructed luma block of the block unit 410. The decoder module 124 may further sub-sample the reconstructed luma block of the block unit 410 to generate the sub-sampled reconstruction block of the block unit 410, and predict the block unit 410 to generate the second chroma prediction block based on the sub-sampled reconstruction block of the block unit 410. In other words, the second chroma prediction block may be generated without using the at least one down-sampling filter and at least one gradient filter.

In addition, the decoder module 124 may determine the second chroma prediction block of the block unit based on the reconstructed luma block of the block unit using an inter cross-component prediction (CCP) merge mode when the block unit 410 is included in the inter-frame. Furthermore, the decoder module 124 may determine the second chroma prediction block of the block unit using the inter CCP merge mode when the block unit 410 is included in the inter-slice. The decoder module 124 may determine an inter CCP merge list of the block unit including multiple inter CCP merge candidates. The inter CCP merge candidates of the block unit may be selected from multiple inter CCP predefined candidates. In some implementations, the inter CCP predefined candidates may include at least one of multiple spatial adjacent inter CCP merge candidates, multiple spatial non-adjacent inter CCP merge candidates, multiple history-based inter CCP merge candidates, multiple temporal inter CCP merge candidates, or multiple default inter CCP merge candidates. In order to establish the inter CCP merge list, the decoder module 124 may determine whether the inter CCP predefined candidates are available for the block unit. When a specific one of the inter CCP predefined candidates is available for the block unit, the specific inter CCP predefined candidate may be regarded as one of the inter CCP merge candidates in the inter CCP merge list. The decoder module 124 may then select one of the inter CCP merge candidates for the block unit to predict the block unit to generate the second chroma prediction block. When the block unit is predicted, the block unit may inherit a cross-component filter of a reference block corresponding to the selected inter CCP merge candidate, which may result in a cross-component filter of the block unit being identical to the cross-component filter of the reference block. Thus, the decoder module 124 may determine the cross-component filter from the selected inter CCP merge candidate.

Referring back to FIG. 8, at block 850, the decoder module 124 may determine, from the video data, a weighting index for selecting multiple weighting parameters of the first chroma prediction block and the second chroma prediction block from multiple predefined parameters based on the weighting index.

In some implementations, with reference to FIGS. 1 and 2, the decoder module 124 may select a first weighting parameter of the first chroma prediction block from multiple first predefined parameters in the predefined parameters. In addition, the decoder module 124 may select a second weighting parameter of the second chroma prediction block from multiple second predefined parameters in the predefined parameters.

In some implementations, each of the first predefined parameters may correspond to one of the second predefined parameters. In addition, each of the second predefined parameters may also correspond to one of the first predefined parameters. Thus, when one of the first predefined parameters is selected, as the first weighting parameter, a specific one of the second predefined parameters may be directly determined, as the second weighting parameter. The specific second predefined parameter may correspond to the selected first predefined parameter.

In some implementations, the first predefined parameters may be included in a first candidate set ($W_{10}$, $W_{11}$, . . . , $W_{1n}$), and the second predefined parameters may be included in a second candidate set ($W_{20}$, $W_{21}$, . . . , $W_{2n}$). In some implementations, the number $N_1$ of the first predefined parameters may be equal to the number $N_2$ of the second predefined parameters. The number $N_1$ and the number $N_2$ may be equal to n+1. In some implementations, n may be a positive integer, such as 3, 4, 5, 6, or 7. Each of the second predefined parameters in the second candidate set may correspond one of the first predefined parameters in the first candidate set, and each of the first predefined parameters in the first candidate set may also correspond one of the second predefined parameters in the second candidate set. In some implementations, each of the second predefined parameters in the second candidate set may be equal to a difference value generated by subtracting a corresponding one of the first predefined parameters in the first candidate set from a predefined value P. The second predefined parameter $W_{20}$ may be equal to $P-W_{10}$, and the second predefined parameter $W_{21}$ may be equal to $P-W_{11}$. In some implementations, P may be a positive integer, such as 1 or 2. When the predefined value P is equal to 1, the second predefined parameters may be, respectively, equal to $1-W_{20}$, $1-W_{21}$, . . . , and $1-W_{2n}$. In some implementations, the first candidate set may be (0, 0.25, 0.5, 0.75, 1), and the second candidate set may be (1, 0.75, 0.5, 0.25, 0}. In some other implementations, the first candidate set may be (0, 0.75, 1), and the second candidate set may be (1, 0.25, 0}.

The decoder module 124 may determine the weighting index from the bitstream. The weighting index may be one of the block level indices, included in the bitstream, for indicating the selected first weighting parameter of the first chroma prediction block. Since each of the first predefined parameters may correspond to one of the second predefined parameters, one of the second weighting parameters may be directly selected when the selected first weighting parameter of the first chroma prediction block is determined. Thus, the weighting index may be used to directly determine the selected first weighting parameter of the first chroma prediction block and the selected second weighting parameter of the second chroma prediction block.

In some implementations, the weighting index may be determined from the bitstream before the first chroma prediction block and the second chroma prediction block are determined. Thus, when the selected first weighting parameter of the first chroma prediction block and the selected second weighting parameter of the second chroma prediction block are both not zero, the decoder module 124 may determine the first chroma prediction block and the second chroma prediction block. In addition, when the selected second weighting parameter is zero, the decoder module 124 may ignore the determination of the second chroma prediction block. In some other implementations, the weighting index may be determined from the bitstream after the first chroma prediction block and the second chroma prediction block are determined. Thus, even if the selected second weighting parameter is zero, the decoder module 124 may determine the first chroma prediction block and the second chroma prediction block.

Referring back to FIG. 8, at block 860, the decoder module 124 may reconstruct the block unit based on the first chroma prediction block, the second chroma prediction block, and the weighting parameters.

With reference to FIGS. 1 and 2, the decoder module 124 may weightedly combine the first chroma prediction block and the second chroma prediction block based on the selected weighting parameters to generate a weighted block.

Figure 9:
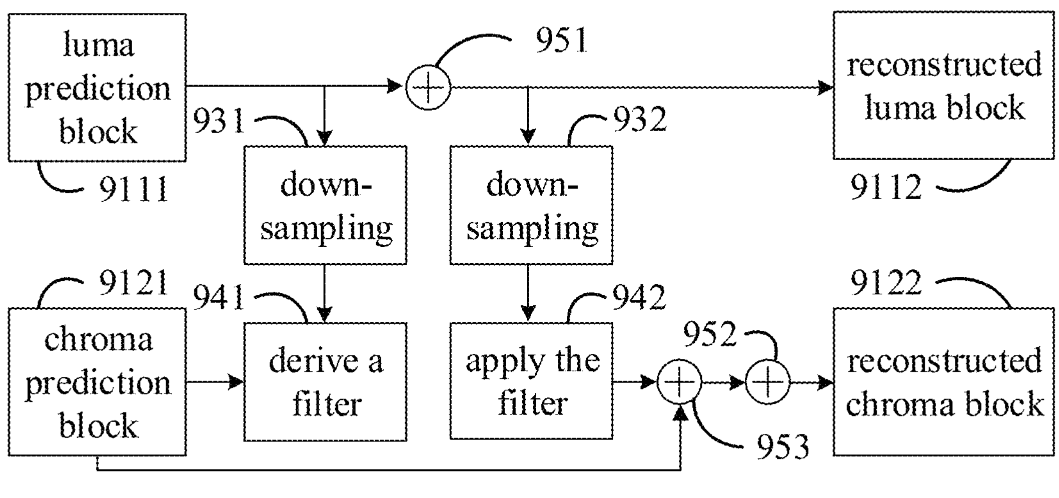
FIG. 9 is a schematic illustration of the prediction of the chroma block unit with a weighted combination, in accordance with one or more example implementations of this disclosure.

For example, FIG. 9 is a schematic illustration of the prediction of the chroma block unit with a weighted combination, in accordance with one or more example implementations of this disclosure. In some implementations, the two down-sampling filters at block 931 and block 932 may be identical. With reference to FIGS. 4A and 4B, at block 931, the luma prediction block 9111 of the luma block unit 411 may be down-sampled by the down-sampling filter to generate a down-sampled prediction block of the luma block unit 411. At block 941, the down-sampled prediction block of the luma block unit 411 and the first chroma prediction block 9121 of the chroma block unit 412 may be used to derive multiple filter coefficients of a cross-component candidate to generate the cross-component filter.

At block 951, the luma prediction block 9111 of the luma block unit 411 may be added to the luma residual block of the luma block unit 411 to generate the reconstructed luma block 9112 of the luma block unit 411. At block 932, the reconstructed luma block 9112 of the luma block unit 411 may be further down-sampled by the down-sampling filter to generate a down-sampled reconstruction block of the luma block unit 411. At block 942, the down-sampled reconstruction block of the luma block unit 411 may be applied to the generated cross-component filter to generate the second chroma prediction block of the chroma block unit 412. At block 953, the first chroma prediction block 9121 and the second chroma prediction block of the chroma block unit 412 may be weightedly combined based on the selected weighting parameters to generate the weighted block.

Comparing the reconstruction of the chroma block unit 412 in FIG. 9 with that of shown in FIG. 5A, at block 953, the first chroma prediction block 9121 and the second chroma prediction block of the chroma block unit 412 may be weightedly combined based on the selected weighting parameters to generate the weighted block, before adding multiple residual components for reconstructing the block unit 410 at block 952. At block 952, the decoder module 124 may then reconstruct the block unit based on the weighted block. The decoder module 124 may determine the residual components of the block unit from the bitstream and add the residual components into the weighted block to generate the reconstructed chroma block 9122 of the block unit 410.

In some implementations, the weightedly combination of the first chroma prediction block and the second chroma prediction block may be regarded as a CCP vector fusion mode. In some implementations, a flag or an index may be added to the bitstream to indicate whether the CCP vector fusion mode is applied on the block unit. For example, a CCP vector fusion flag equal to one may specify that the block unit is reconstructed based on the first chroma prediction block and the chroma second prediction block of the block unit.

In some implementations, blocks 830-860 in the method/process 800 may be applied on the block unit 410, only when the block unit 410 in the inter-frame is inter-predicted based on the luma motion vector. In other words, block 830-860 in the method/process 800 may not be applied when the block unit 410 is intra-predicted in the inter-frame. In some other implementations, blocks 830-860 in the method/process 800 may be applied on the block unit 410, only when the block unit 410 in the inter-frame is inter-predicted based on the luma motion vector or intra-predicted based on the luma IBC vector. In other words, block 830-860 in the method/process 800 may not be applied when the block unit 410 in the inter-frame is intra-predicted by other intra prediction modes different from an IBC mode, using the luma IBC vector. In yet some other implementations, blocks 830-860 in the method/process 800 may be applied on the block unit 410, only when the block unit 410 in the inter-frame is inter-predicted based on the luma motion vector or intra-predicted based on the luma IBC vector or the IntraTMP mode. In other words, block 830-860 in the method/process 800 may not be applied when the block unit 410 is intra-predicted by other intra prediction mode different from the IBC mode and the IntraTMP mode.

The decoder module 124 may reconstruct all of the other block units in the image frame for reconstructing the image frame and the video. The method/process 800 may then end.

Figure 10:
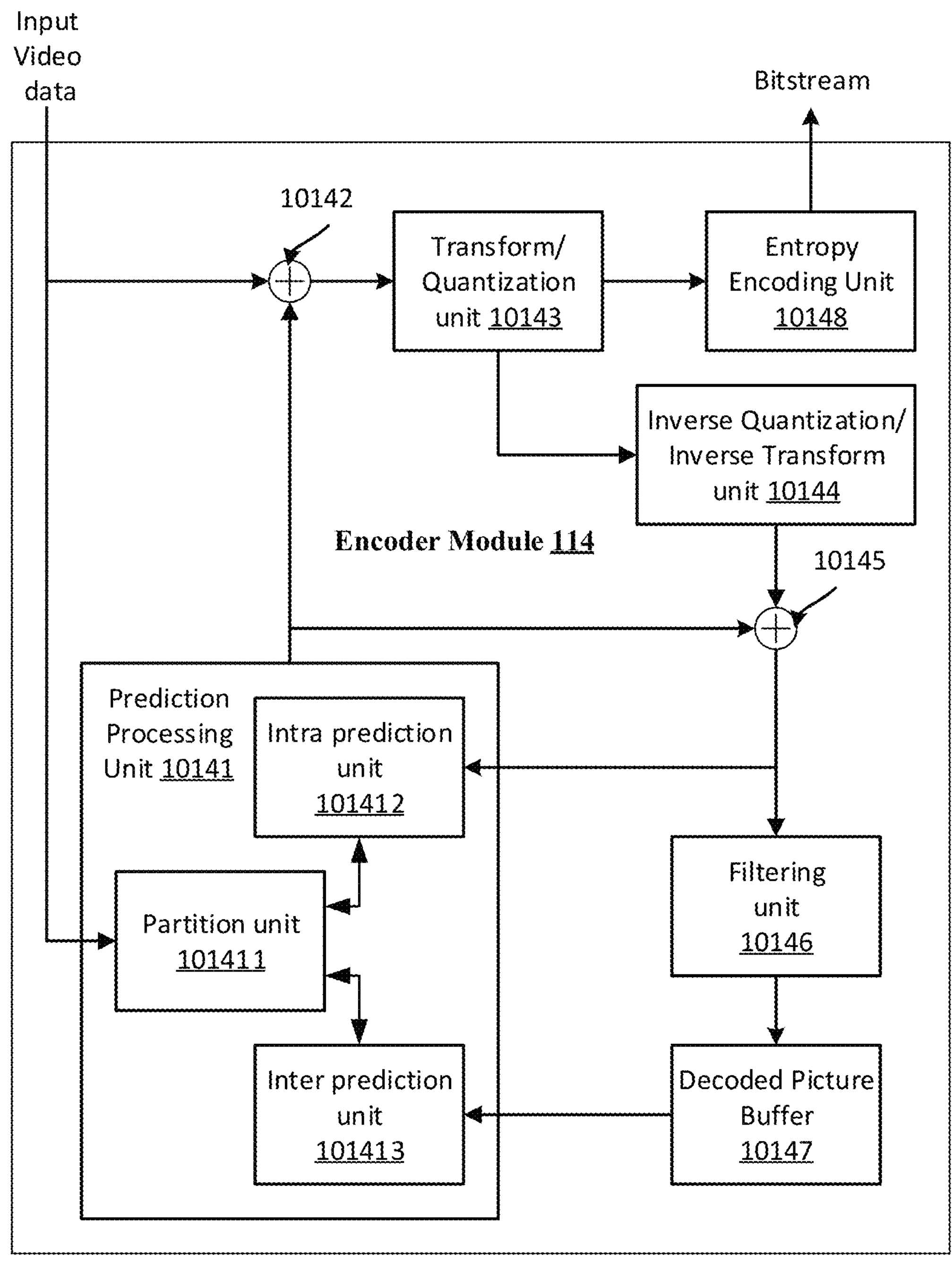
FIG. 10 is a block diagram illustrating an encoder module of the first electronic device illustrated in FIG. 1, in accordance with one or more example implementations of this disclosure.

FIG. 10 is a block diagram illustrating an encoder module 114 of the first electronic device 110 illustrated in FIG. 1, in accordance with one or more example implementations of this disclosure. The encoder module 114 may include a prediction processor (e.g., a prediction processing unit 10141), at least a first summer (e.g., a first summer 10142) and a second summer (e.g., a second summer 10145), a transform/quantization processor (e.g., a transform/quantization unit 10143), an inverse quantization/inverse transform processor (e.g., an inverse quantization/inverse transform unit 10144), a filter (e.g., a filtering unit 10146), a decoded picture buffer (e.g., a decoded picture buffer 10147), and an entropy encoder (e.g., an entropy encoding unit 10148). The prediction processing unit 10141 of the encoder module 114 may further include a partition processor (e.g., a partition unit 101411), an intra prediction processor (e.g., an intra prediction unit 101412), and an inter prediction processor (e.g., an inter prediction unit 101413). The encoder module 114 may receive the source video and encode the source video to output a bitstream.

The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 10141 may receive a current image block of a specific one of the image frames. The current image block may be the luminance block or one of the chrominance blocks in the specific image frame.

The partition unit 101411 may divide the current image block into multiple block units. The intra prediction unit 101412 may perform intra-predictive coding of a current block unit relative to one or more neighboring blocks in the same frame, as the current block unit, in order to provide spatial prediction. The inter prediction unit 101413 may perform inter-predictive coding of the current block unit relative to one or more blocks in one or more reference image blocks to provide temporal prediction.

The prediction processing unit 10141 may select one of the coding results generated by the intra prediction unit 101412 and the inter prediction unit 101413 based on a mode selection method, such as a cost function. The mode selection method may be a rate-distortion optimization (RDO) process.

The prediction processing unit 10141 may determine the selected coding result and provide a predicted block corresponding to the selected coding result to the first summer 10142 for generating a residual block and to the second summer 10145 for reconstructing the encoded block unit. The prediction processing unit 10141 may further provide syntax elements, such as motion vectors, intra-mode indicators, partition information, and/or other syntax information, to the entropy encoding unit 10148.

The intra prediction unit 101412 may intra-predict the current block unit. The intra prediction unit 101412 may determine an intra prediction mode directed toward a reconstructed sample neighboring the current block unit in order to encode the current block unit.

The intra prediction unit 101412 may encode the current block unit using various intra prediction modes. The intra prediction unit 101412 of the prediction processing unit 10141 may select an appropriate intra prediction mode from the selected modes. The intra prediction unit 101412 may encode the current block unit using a cross-component prediction mode to predict one of the two chroma components of the current block unit based on the luma components of the current block unit. The intra prediction unit 101412 may predict a first one of the two chroma components of the current block unit based on the second of the two chroma components of the current block unit.

The inter prediction unit 101413 may inter-predict the current block unit as an alternative to the intra prediction performed by the intra prediction unit 101412. The inter prediction unit 101413 may perform motion estimation to estimate motion of the current block unit for generating a motion vector.

The motion vector may indicate a displacement of the current block unit within the current image block relative to a reference block unit within a reference image block. The inter prediction unit 101413 may receive at least one reference image block stored in the decoded picture buffer 10147 and estimate the motion based on the received reference image blocks to generate the motion vector.

The first summer 10142 may generate the residual block by subtracting the prediction block determined by the prediction processing unit 10141 from the original current block unit. The first summer 10142 may represent the component or components that perform this subtraction.

The transform/quantization unit 10143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 10143 may perform a scan of the matrix including the quantized transform coefficients. Alternatively, the entropy encoding unit 10148 may perform the scan.

The entropy encoding unit 10148 may receive multiple syntax elements from the prediction processing unit 10141 and the transform/quantization unit 10143, including a quantization parameter, transform data, motion vectors, intra modes, partition information, and/or other syntax information. The entropy encoding unit 10148 may encode the syntax elements into the bitstream.

The entropy encoding unit 10148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 10144 may apply inverse quantization and inverse transformation to reconstruct the residual block in the pixel domain for later use as a reference block. The second summer 10145 may add the reconstructed residual block to the prediction block provided by the prediction processing unit 10141 in order to produce a reconstructed block for storage in the decoded picture buffer 10147.

The filtering unit 10146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 10145.

The decoded picture buffer 10147 may be a reference picture memory that stores the reference block to be used by the encoder module 1014 to encode video, such as in intra-coding or inter-coding modes. The decoded picture buffer 10147 may include a variety of memory devices, such as DRAM (e.g., including SDRAM), MRAM, RRAM, or other types of memory devices. The decoded picture buffer 10147 may be on-chip with other components of the encoder module 114 or off-chip relative to those components.

The method/process 300 for decoding and/or encoding video data may be performed by the first electronic device 110. With reference to FIGS. 1 and 10, at block 310, the method/process 300 may start by the encoder module 114 receiving the video data. The video data received by the encoder module 114 may be a video. At block 320, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks, according to the partition indications (e.g., based on any video coding standard).

At block 330, the encoder module 114 may determine a chroma prediction block of the block unit based on a luma vector of the block unit. With reference to FIGS. 1 and 10, the luma vector of the block unit determined by the encoder module 114 may be identical to that determined by the decoder module 124. Furthermore, the chroma block unit 412 may further include a Cr block unit and a Cb block unit. In addition, the chroma prediction block of the block unit 410 may be one of a Cr reconstruction block and a Cb reconstruction block of the chroma reference unit 422 determined based on the luma vector 4100 of the block unit 410.

At block 340, the encoder module 114 may predict the block unit 410 to generate a predicted chroma block using a cross-component filter and at least one down-sampling filter based on a reconstructed luma block of the block unit 410. With reference to FIGS. 1 and 10, the predicted chroma block determined by the encoder module 114 may be identical to that determined by the decoder module 124.

The encoder module 114 may determine at least one cross-component candidate and at least one down-sampling candidate for generating at least one predicted chroma block. The number of at least one cross-component candidate may be equal to Ncc. Ncc may be a positive integer, such as 1, 2, 3, or 4. The at least one cross-component candidate determined by the encoder module 114 may be identical to that determined by the decoder module 124. In addition, the number of at least one down-sampling candidate is equal to Ndc. Ndc may be a positive integer, such as 1, 2, 3, or 4. The at least one down-sampling candidate determined by the encoder module 114 may be identical to that determined by the decoder module 124. The number of at least one candidate set may be equal to Nes, less than, or equal to, Ncc×Ndc. Nes may be a positive integer, such as 1, 2, 3, 4, 6, 8, 12, or 16. Each of the at least one candidate set established by the at least one cross-component candidate and the at least one down-sampling candidate may be used to generate the predicted chroma block.

Furthermore, the number of at least one usage scheme for the at least one cross-component candidate and the at least one down-sampling candidate may be equal to Nus. Nus may be a positive integer, such as 1, 2, 3, or 4. With reference to FIGS. 5A-5C, there may be three different usage schemes for one of the at least one cross-component candidate and one of the at least one down-sampling candidate. In addition, the at least one usage scheme may further include a merge scheme. In the merge scheme, more than one down-sampling filter may be merged into a cross-component filter for generating the predicted chroma block. It should be noted that the usage schemes may be changed without departing from the scope of the present disclosure.

The encoder module 114 may determine Npc predicted chroma blocks based on the at least one usage scheme and the at least one candidate set. Npc may be a positive integer greater than, or equal to, 1 and less than, or equal to, Nes×Nus.

The Cr block unit and the Cb block unit of the chroma block unit 412 may be respectively predicted and reconstructed. Thus, the encoder module 114 may determine Npc predicted chroma block for the Cr block unit, and further determine Npc predicted chroma block for the Cb block unit.

Referring back to FIG. 3, at block 350, the encoder module 124 may reconstruct the block unit based on the predicted chroma block. With reference to FIGS. 1 and 10, the block unit reconstructed by the encoder module 114 may be identical to that reconstructed by the decoder module 124.

Besides the Npc predicted chroma blocks, the encoder module 124 may weightedly combine the chroma prediction block with each of the Npc predicted chroma blocks based on multiple weighting parameters to generate a weighted block. The weighting parameters may be predefined and fixed in the decoder module 124 and the encoder module 114. For example, the weighting parameter of the predicted chroma block may be predefined to be equal to 0.75, and the weighting parameter of the chroma prediction block may be predefined to be equal to 0.25. Thus, the number Nw of the weighted blocks may be equal to Npc. In some implementations, the Nw weighting blocks may be added into the predicted chroma blocks. Thus, the number of predicted chroma blocks may increase to Nw+Npc. In some implementations, the weighting blocks may not be allowed to add into the predicted chroma blocks, such that the encoder module 124 may not weightedly combine the chroma prediction block with each of the Npc predicted chroma blocks. Thus, the number of predicted chroma blocks may remain as Npc.

The encoder module 114 may predict the block unit based on other prediction modes to generate multiple chroma predicted blocks. The encoder module 114 may select one of the predicted chroma blocks and the chroma predicted blocks based on a mode selection method, such as a cost function. The mode selection method may be an RDO process, a Sum of Absolute Difference (SAD) process, a Sum of Absolute Transformed Difference (SATD) process, a Mean Absolute Difference (MAD) process, a Mean Squared Difference (MSD) process, and a Structural SIMilarity (SSIM) process. The encoder module 114 may provide the selected coding result to the first summer 10142 for generating a residual block and to the second summer 10145 for reconstructing the encoded block unit. The reconstruction of the block unit by the encoder module 114 may be identical to the reconstruction of the block unit by the decoder module 124.

When a specific one of the Npc predicted chroma blocks is selected, a specific one of the Ncc cross-component candidates and a specific one of the Ndc down-sampling candidates used for generating the specific predicted chroma block are selected. Thus, the encoder module 114 may further provide syntax elements, such as a cross-component index and a down-sampling index, included in the bitstream for transmitting to the decoder module 124. The cross-component index may be used for determining the specific cross-component candidate, and the down-sampling index may be used for determining the specific down-sampling candidate. In some implementations, when the Nw weighting blocks are allowed to add into the predicted chroma blocks, the encoder module 114 may further provide a CCRM weighting flag included in the bitstream for transmitting to the decoder module 124. The CCRM weighting flag may be used to indicate whether the block unit is reconstructed based on the combination of the predicted chroma block and the chroma prediction block of the block unit.

In some implementations, the bitstream may include no gradient index when the encoder module 114 and the decoder module 124 store only one gradient candidate. In addition, the bitstream may include no cross-component index when the encoder module 114 and the decoder module 124 store only one cross-component candidate.

The method/process 300 for the encoder module 114 may then end.

The method/process 600 for decoding and/or encoding video data may be performed by the first electronic device 110. With reference to FIGS. 1 and 10, at block 610, the method/process 600 may start by the encoder module 114 receiving the video data. The video data received by the encoder module 114 may be a video. At block 620, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks, according to the partition indications (e.g., based on any video coding standard).

At block 630, the encoder module 114 may determine a chroma prediction block of the block unit based on a luma vector of the block unit. With reference to FIGS. 1 and 10, the luma vector of the block unit determined by the encoder module 114 may be identical to that determined by the decoder module 124. Furthermore, the chroma block unit 412 may further include a Cr block unit and a Cb block unit. In addition, the chroma prediction block of the block unit 410 may be one of a Cr reconstruction block and a Cb reconstruction block of the chroma reference unit 422 determined based on the luma vector 4100 of the block unit 410.

At block 640, the encoder module 114 may predict the block unit 410 to generate a predicted chroma block using a cross-component filter and at least one gradient filter based on a reconstructed luma block of the block unit 410. With reference to FIGS. 1 and 10, the predicted chroma block determined by the encoder module 114 may be identical to that determined by the decoder module 124.

The encoder module 114 may determine at least one cross-component candidate and at least one gradient candidate for generating at least one predicted chroma block. The number of at least one cross-component candidate may be equal to Ncc. Ncc may be a positive integer, such as 1, 2, 3, or 4. The at least one cross-component candidate determined by the encoder module 114 may be identical to that determined by the decoder module 124. In addition, the number of at least one gradient candidate is equal to Ngc. Ngc may be a positive integer, such as 1, 2, 3, or 4. The at least one gradient candidate determined by the encoder module 114 may be identical to that determined by the decoder module 124. The number of at least one candidate set may be equal to Ncs, less than, or equal to, Ncc×Ngc. Nes may be a positive integer, such as 1, 2, 3, 4, 6, 8, 12, or 16. Each of the at least one candidate set established by the at least one cross-component candidate and the at least one gradient candidate may be used to generate the predicted chroma block.

Furthermore, the number of at least one usage scheme for the at least one cross-component candidate and the at least one gradient candidate may be equal to Nus. Nus may be a positive integer, such as 1, 2, 3, or 4. With reference to FIGS. 7A and 7B, there may be two different usage schemes for one of the at least one cross-component candidate and one of the at least one gradient candidate. In addition, the at least one usage scheme may further include a merge scheme. In the merge scheme, more than one gradient filter may be merged into a cross-component filter for generating the predicted chroma block. Furthermore, the at least one usage scheme may further include a multi-model scheme. In the multi-model scheme, the luma values (e.g., the luma prediction block 7111 and the reconstructed luma block 7112) may be classified into two luma groups based on a mean value of the luma values. In addition, each of the gradient values may also be classified into two gradient groups based on the relationship between a corresponding one of the luma values and the mean value of the luma values. The encoder module 114 may predict the block unit 410 to generate the predicted chroma block using the two cross-component filters based on the two luma groups and the two gradient groups. It should be noted that the usage schemes may be changed without departing from the scope of the present disclosure.

The encoder module 114 may determine Npc predicted chroma blocks based on the at least one usage scheme and the at least one candidate set. Npc may be a positive integer greater than, or equal to, 1 and less than, or equal to, Ncs×Nus.

The Cr block unit and the Cb block unit of the chroma block unit 412 may be respectively predicted and reconstructed. Thus, the encoder module 114 may determine Npc predicted chroma block for the Cr block unit, and further determine Npc predicted chroma block for the Cb block unit.

Referring back to FIG. 6, at block 650, the encoder module 124 may reconstruct the block unit based on the predicted chroma block. With reference to FIGS. 1 and 10, the block unit reconstructed by the encoder module 114 may be identical to that reconstructed by the decoder module 124. In addition, the reconstruction of the block unit at block 650 by the encoder module 114 may be identical to the reconstruction of the block unit at block 350 by the encoder module 114.

When a specific one of the Npc predicted chroma blocks is selected, a specific one of the Ncc cross-component candidates and a specific one of the Ngc gradient candidates used for generating the specific predicted chroma block are selected. Thus, the encoder module 114 may further provide syntax elements, such as a cross-component index and a gradient index, included in the bitstream for transmitting to the decoder module 124. The cross-component index may be used for determining the specific cross-component candidate, and the gradient index may be used for determining the specific gradient candidate. In some implementations, when the Nw weighting blocks are allowed to add into the predicted chroma blocks, the encoder module 114 may further provide a CCRM weighting flag included in the bitstream for transmitting to the decoder module 124. The CCRM weighting flag may be used to indicate whether the block unit is reconstructed based on the combination of the predicted chroma block and the chroma prediction block of the block unit.

In some implementations, the bitstream may include no gradient index when the encoder module 114 and the decoder module 124 store only one gradient candidate. In addition, the bitstream may include no cross-component index when the encoder module 114 and the decoder module 124 store only one cross-component candidate.

The method/process 600 for the encoder module 114 may then end.

The method/process 800 for decoding and/or encoding video data may be performed by the first electronic device 110. With reference to FIGS. 1 and 10, at block 810, the method/process 800 may start by the encoder module 114 receiving the video data. The video data received by the encoder module 114 may be a video. At block 820, the encoder module 114 may determine a block unit from a current frame included in the video data. The encoder module 114 may divide the current frame to generate multiple CTUs, and further divide a current CTU included in the CTUs to generate multiple divided blocks and to determine the block unit from the divided blocks, according to the partition indications (e.g., based on any video coding standard).

At block 830, the encoder module 114 may determine a first chroma prediction block of the block unit based on a luma vector of the block unit. With reference to FIGS. 1 and 10, the luma vector of the block unit determined by the encoder module 114 may be identical to that determined by the decoder module 124. Furthermore, the chroma block unit 412 may further include a Cr block unit and a Cb block unit. In addition, the chroma prediction block of the block unit 410 may be one of a Cr reconstruction block and a Cb reconstruction block of the chroma reference unit 422 determined based on the luma vector 4100 of the block unit 410.

At block 840, the encoder module 114 may determine a second chroma prediction block of the block unit using a cross-component filter based on a reconstructed luma block of the block unit. With reference to FIGS. 1 and 10, the second predicted chroma block determined by the encoder module 114 may be identical to that determined by the decoder module 124.

The determination of the second chroma prediction blocks at block 840 in the method/process 800 by the encoder module 114 may be identical to the generation of the predicted chroma blocks at block 340 in the method/process 300 by the encoder module 114. Thus, the encoder module 114 may determine Ncp1 second chroma prediction blocks based on the at least one usage scheme and the at least one candidate set in the method/process 300. Ncp1 may be a positive integer greater than, or equal to, 1, and less than, or equal to, Npc in the method/process 300.

The determination of the second chroma prediction blocks at block 840 in the method/process 800 by the encoder module 114 may be identical to the generation of the predicted chroma blocks at block 640 in the method/process 600 by the encoder module 114. Thus, the encoder module 114 may determine Ncp2 second chroma prediction blocks based on the at least one usage scheme and the at least one candidate set in the method/process 600. Ncp2 may be a positive integer greater than, or equal to, 1 and less than, or equal to, Npc in the method/process 600.

Furthermore, the determination of the second chroma prediction block using a CCRM at block 840 by the encoder module 114 may be identical to the determination of the second chroma prediction block using the CCRM at block 840 by the decoder module 124. In other words, the cross-component filter in the CCRM may be derived without using the at least one down-sampling filter and at least one gradient filter.

In addition, the determination of the second chroma prediction blocks using an inter CCP merge mode at block 840 by the encoder module 114 may be identical to the determination of the second chroma prediction block using the inter CCP merge mode at block 840 by the decoder module 124. Multiple inter CCP merge candidates in the inter CCP merge list determined by the encoder module 114 may be identical to those determined by the decoder module 124. The inheritance of the cross-component filter in each of the inter CCP merge candidates may be identical to those determined by the decoder module 124.

The second chroma prediction blocks in the method/process 800 determined by the encoder module 114 may include one or more of the Ncp1 second chroma prediction blocks using the at least one down-sampling filter, Ncp2 second chroma prediction blocks using the at least one gradient filter, the second chroma prediction block using the CCRM, and the second chroma prediction blocks using the inter CCP merge mode. Thus, the total number of second chroma prediction blocks may be equal to Nt. Nt may be a positive integer, greater than, or equal to, one.

Referring back to FIG. 8, at block 850, the encoder module 114 may determine, from the video data, a weighting index for selecting multiple weighting parameters of the first chroma prediction block and the second chroma prediction block from multiple predefined parameters based on the weighting index.

The predefined parameters may include multiple first predefined parameters and the multiple second predefined parameters. The first predefined parameters and the second predefined parameters determined by the encoder module 114 may be identical to those determined by the decoder module 124. The weighting index may be determined for selecting the weighting parameters of the first chroma prediction block and the second chroma prediction block when one of the second chroma prediction blocks is finally selected in the following block of method/process 600.

At block 860, the decoder module 124 may reconstruct the block unit based on the first chroma prediction block, the second chroma prediction block, and the weighting parameters. With reference to FIGS. 1 and 10, the encoder module 114 may weightedly combine the first chroma prediction block and each of the second chroma prediction blocks based on the weighting parameters to generate multiple weighted blocks.

The encoder module 114 may predict the block unit based on other prediction modes to generate multiple chroma predicted blocks. The encoder module 114 may select one of the weighted blocks and the chroma predicted blocks based on a mode selection method, such as a cost function. The mode selection method may be an RDO process, an SAD process, an SATD process, an MAD process, an MSD process, and an SSIM process. The encoder module 114 may provide the selected coding result to the first summer 10142 for generating a residual block and to the second summer 10145 for reconstructing the encoded block unit. The reconstruction of the block unit by the encoder module 114 may be identical to the reconstruction of the block unit by the decoder module 124.

When a specific one of the weighted blocks is selected, a specific one of the first predefined parameters and a specific one of the second predefined parameters used for generating the specific weighted block are selected. Thus, the encoder module 114 may further provide syntax elements, such as a weighting index, included in the bitstream for transmitting to the decoder module 124. The weighting index may be used for determining the specific first predefined parameter and the specific second predefined parameter. In some implementations, the other syntax elements, such as a down-sampling index, a gradient index, and a cross-component index in method/process 300 and method/process 600, included in the bitstream for transmitting to the decoder module 124.

The method/process 800 for the encoder module 114 may then end.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data performed by an electronic device, the method comprising:

receiving the video data;

determining a block unit from a current frame that is included in the video data;

determining a first chroma prediction block of the block unit based on a luma vector of the block unit;

determining, in a cross-component residual model (CCRM), a second chroma prediction block of the block unit using a cross-component filter and a luma down-sampling filter based on a reconstructed luma block of the block unit;

determining, from the video data, a weighting index and selecting, from a plurality of predefined parameters, a plurality of weighting parameters of the first chroma prediction block and the second chroma prediction block based on the weighting index; and reconstructing the block unit based on the first chroma prediction block, the second chroma prediction block, and the plurality of weighting parameters.

2. The method according to claim 1, further comprising:

weightedly combining the first chroma prediction block and the second chroma prediction block based on the plurality of weighting parameters to generate a predicted chroma block, wherein reconstructing the block unit is further based on the predicted chroma block.

3. The method according to claim 1, wherein determining the first chroma prediction block of the block unit based on the luma vector of the block unit comprises:

determining a reference block that is indicated by the luma vector of the block unit, and determining a chroma reconstruction block of the reference block as the first chroma prediction block of the block unit.

4. The method according to claim 3, wherein determining, in the CCRM, the second chroma prediction block of the block unit using the cross-component filter and the luma down-sampling filter comprises:

determining a luma reconstruction block of the reference block as a luma prediction block of the block unit, and deriving the cross-component filter based on the luma prediction block and the first chroma prediction block of the block unit for determining the second chroma prediction block of the block unit, wherein the cross-component filter is derived by using the luma down-sampling filter.

5. The method according to claim 3, wherein:

the current frame is an inter-frame, the reference block is included in the current frame, and the luma vector of the block unit comprises a luma block vector having a direction from the block unit to the reference block in the current frame.

6. The method according to claim 5, wherein:

the luma block vector is determined based on one of a luma intra block copy (IBC) vector and an intra template matching prediction (IntraTMP) mode.

7. The method according to claim 3, wherein:

the current frame is an inter-frame, the reference block is included in a reference frame, different from the current frame, and the luma vector of the block unit comprises a luma motion vector having a direction from a co-located block of the block unit to the reference block in the reference frame.

8. The method according to claim 1, further comprising:

selecting one of a plurality of inter cross-component prediction (CCP) merge candidates for the block unit; and determining the cross-component filter from the selected one of the plurality of inter CCP merge candidates.

9. An electronic device for decoding video data, the electronic device comprising:

at least one processor; and at least one non-transitory computer-readable medium coupled to the at least one processor and storing one or more computer-executable instructions that, when executed by the at least one processor, cause the electronic device to:

receive the video data;

determine a block unit from a current frame that is included in the video data;

determine a first chroma prediction block of the block unit based on a luma vector of the block unit;

determine, in a cross-component residual model (CCRM), a second chroma prediction block of the block unit using a cross-component filter and a luma down-sampling filter based on a reconstructed luma block of the block unit;

determine, from the video data, a weighting index and select, from a plurality of predefined parameters, a plurality of weighting parameters of the first chroma prediction block and the second chroma prediction block based on the weighting index; and reconstruct the block unit based on the first chroma prediction block, the second chroma prediction block, and the plurality of weighting parameters.

10. The electronic device according to claim 9, wherein the one or more computer-executable instructions, when executed by the at least one processor, further cause the electronic device to:

weightedly combine the first chroma prediction block and the second chroma prediction block based on the plurality of weighting parameters to generate a predicted chroma block, wherein reconstructing the block unit is further based on the predicted chroma block.

11. The electronic device according to claim 9, wherein determining the first chroma prediction block of the block unit based on the luma vector of the block unit comprises:

determining a reference block that is indicated by the luma vector of the block unit, and determining a chroma reconstruction block of the reference block as the first chroma prediction block of the block unit.

12. The electronic device according to claim 11, wherein determining, in the CCRM, the second chroma prediction block of the block unit using the cross-component filter and the luma down-sampling filter comprises:

determining a luma reconstruction block of the reference block as a luma prediction block of the block unit, and deriving the cross-component filter based on the luma prediction block and the first chroma prediction block of the block unit for determining the second chroma prediction block of the block unit, wherein the cross-component filter is derived by using the luma down-sampling filter.

13. The electronic device according to claim 11, wherein:

the current frame is an inter-frame, the reference block is included in the current frame, and the luma vector of the block unit comprises a luma block vector having a direction from the block unit to the reference block in the current frame.

14. The electronic device according to claim 13, wherein:

the luma block vector is determined based on one of a luma intra block copy (IBC) vector and an intra template matching prediction (IntraTMP) mode.

15. The electronic device according to claim 11, wherein:

the current frame is an inter-frame, the reference block is included in a reference frame, different from the current frame, and the luma vector of the block unit comprises a luma motion vector having a direction from a co-located block of the block unit to the reference block in the reference frame.

16. The electronic device according to claim 10, wherein the one or more computer-executable instructions, when executed by the at least one processor, further cause the electronic device to:

select one of a plurality of inter cross-component prediction (CCP) merge candidates for the block unit; and determine the cross-component filter from the selected one of the plurality of inter CCP merge candidates.

17. The method according to claim 4, wherein determining, in the CCRM, the second chroma prediction block of the block unit using the cross-component filter and the luma down-sampling filter comprises:

adding a luma residual block of the block unit to the luma prediction block of the block unit to generate a reconstructed luma block of the block unit, applying the luma down-sampling filter on the reconstructed luma block of the block unit to generate a down-sampled luma reconstruction block of the block unit, and applying the cross-component filter on the down-sampled luma reconstruction block of the block unit to generate the second chroma prediction block of the block unit.

18. The method according to claim 4, wherein determining, in the CCRM, the second chroma prediction block of the block unit using the cross-component filter and the luma down-sampling filter comprises:

adding a luma residual block of the block unit to the luma prediction block of the block unit to generate a reconstructed luma block of the block unit, and directly applying the cross-component filter on the reconstructed luma block of the block unit, without using the luma down-sampling filter, to generate the second chroma prediction block of the block unit.

19. The method according to claim 3, wherein determining, in the CCRM, the second chroma prediction block of the block unit using the cross-component filter and the luma down-sampling filter comprises:

determining a luma reconstruction block of the reference block as a luma prediction block of the block unit, directly deriving the cross-component filter based on the luma prediction block and the first chroma prediction block of the block unit without using the luma down-sampling filter, adding a luma residual block of the block unit to the luma prediction block of the block unit to generate a reconstructed luma block of the block unit, applying the luma down-sampling filter on the reconstructed luma block of the block unit to generate a down-sampled luma reconstruction block of the block unit, and applying the cross-component filter on the down-sampled luma reconstruction block of the block unit to generate the second chroma prediction block of the block unit.

* * * * *